US011906335B2

(12) United States Patent
Kirst

(10) Patent No.: US 11,906,335 B2
(45) Date of Patent: Feb. 20, 2024

(54) MEASURING SYSTEM AND METHOD FOR MEASURING A MEASUREMENT VARIABLE OF A FLOWING FLUID

(71) Applicant: Endress+Hauser Flowtec AG, Reinach (CH)

(72) Inventor: Michael Kirst, Lörrach (DE)

(73) Assignee: Endress+Hauser Flowtec AG, Reinach (CH)

( * ) Notice: Subject to any disclaimer, the term of this patent is extended or adjusted under 35 U.S.C. 154(b) by 665 days.

(21) Appl. No.: 17/052,460

(22) PCT Filed: Apr. 11, 2019

(86) PCT No.: PCT/EP2019/059253
§ 371 (c)(1),
(2) Date: Nov. 2, 2020

(87) PCT Pub. No.: WO2019/211074
PCT Pub. Date: Nov. 7, 2019

(65) Prior Publication Data
US 2021/0140804 A1 May 13, 2021

(30) Foreign Application Priority Data
May 2, 2018 (DE) .................. 10 2018 110 456.1

(51) Int. Cl.
*G01F 1/22* (2006.01)
*G01F 1/325* (2022.01)
(Continued)

(52) U.S. Cl.
CPC .............. *G01F 1/3259* (2022.01); *G01F 1/38* (2013.01); *G01F 1/42* (2013.01); *G01F 1/66* (2013.01); *G01F 1/8468* (2013.01)

(58) Field of Classification Search
CPC . G01F 1/36; G01F 5/00; G01F 1/3287; G01F 1/8477
See application file for complete search history.

(56) References Cited

U.S. PATENT DOCUMENTS 5,814,738 A * 9/1998 Pinkerton ............. G01F 1/3218
73/861.55
6,212,975 B1 4/2001 Cook
(Continued)

FOREIGN PATENT DOCUMENTS

CN 181673 A 8/2006
CN 101644590 A 2/2010
(Continued)

OTHER PUBLICATIONS

Moschytz, George and Hofbauer, Markus, Adaptive Filter, Eine Einführung in die Theorie mit Aufgaben und MATLAB-Simulationen auf CD-ROM, 164 pp.
(Continued)

*Primary Examiner* — Lam S Nguyen
(74) *Attorney, Agent, or Firm* — Christopher R. Powers; Endress+Hauser (USA) Holding, Inc.

(57) ABSTRACT

A measuring system includes: a lumen forming a flow path and a flow obstruction arranged in the flow path for effecting a disturbance in a flowing fluid; a sensor arrangement adapted to produce a first sensor signal and a second sensor signal; and transmitter electronics. The transmitter electronics are adapted to receive both the first and second sensor signals and to convert such into first and second sensor signal sampling sequences approximating the first and second sensor signals, respectively, the transmitter electronics further adapted using a digital adaptive filter to ascertain from the first sampling sequence a filter coefficients set and therewith to form a z-transfer function for filtering the second sampling sequence such that the z-transfer function (Continued)

is determined by the filter coefficients set, the signal filter and the second sampling sequence to produce a wanted signal sequence, to produce therefrom digital measured values representing a measurement variable.

33 Claims, 9 Drawing Sheets

(51) Int. Cl.
*G01F 1/38* (2006.01)
*G01F 1/42* (2006.01)
*G01F 1/66* (2022.01)
*G01F 1/84* (2006.01)

(56) References Cited

U.S. PATENT DOCUMENTS

| | | | |
|---|---|---|---|
| 7,040,179 B2* | 5/2006 | Drahm | G01F 1/849 |
| | | | 73/861.356 |
| 2005/0044929 A1* | 3/2005 | Gysling | G01F 1/8477 |
| | | | 73/32 A |
| 2007/0084298 A1 | 4/2007 | Rieder et al. | |
| 2007/0089502 A1 | 4/2007 | Martin | |
| 2011/0247423 A1 | 10/2011 | Schlachter et al. | |
| 2012/0192657 A1 | 8/2012 | Gossner | |
| 2017/0328750 A1 | 11/2017 | Jehle et al. | |

FOREIGN PATENT DOCUMENTS

| | | |
|---|---|---|
| CN | 101657699 A | 2/2010 |
| CN | 107636424 A | 1/2018 |
| DE | 102011008984 A1 | 7/2012 |
| DE | 102017012066 A1 | 7/2019 |
| DE | 102017012067 A1 | 7/2019 |
| EP | 3309521 A1 | 4/2018 |
| JP | 6082281 A | 3/1994 |
| WO | 9004230 A1 | 4/1990 |
| WO | 9508758 A1 | 3/1995 |
| WO | 9850761 A1 | 11/1998 |
| WO | 0034744 A1 | 6/2000 |
| WO | 2005033634 A1 | 4/2005 |
| WO | 2008061551 A1 | 5/2008 |
| WO | 2009012230 A1 | 1/2009 |
| WO | 2009089438 A1 | 7/2009 |
| WO | 2009158605 A2 | 12/2009 |
| WO | 2010128289 A1 | 11/2010 |
| WO | 2012118690 A1 | 9/2012 |
| WO | 2013174956 A1 | 11/2013 |
| WO | 2013180843 A2 | 12/2013 |
| WO | 2014149203 A1 | 9/2014 |
| WO | 2015049488 A1 | 4/2015 |
| WO | 2016053492 A1 | 4/2016 |
| WO | 2017049782 A1 | 3/2017 |
| WO | 2018016984 A1 | 1/2018 |

OTHER PUBLICATIONS

Analoge Singale für Regel- und Steueranlagen Analoge Gleichstromsignale Identisch mit IEC 381-1 Ausgabe 1982, DK 681.5 : 621.3-52/-53 : 621.3.024.015 : 621.3.037.33 : 001.4, Nov. 1985, 4 pp.

Z-Tranformation-Wikipedia, Apr. 26, 2018 (Apr. 26, 2018), XP055856290, URL:https//de.wikipedia.org/w/index.php?title=Z-Transformation&oldid=176877774.

* cited by examiner

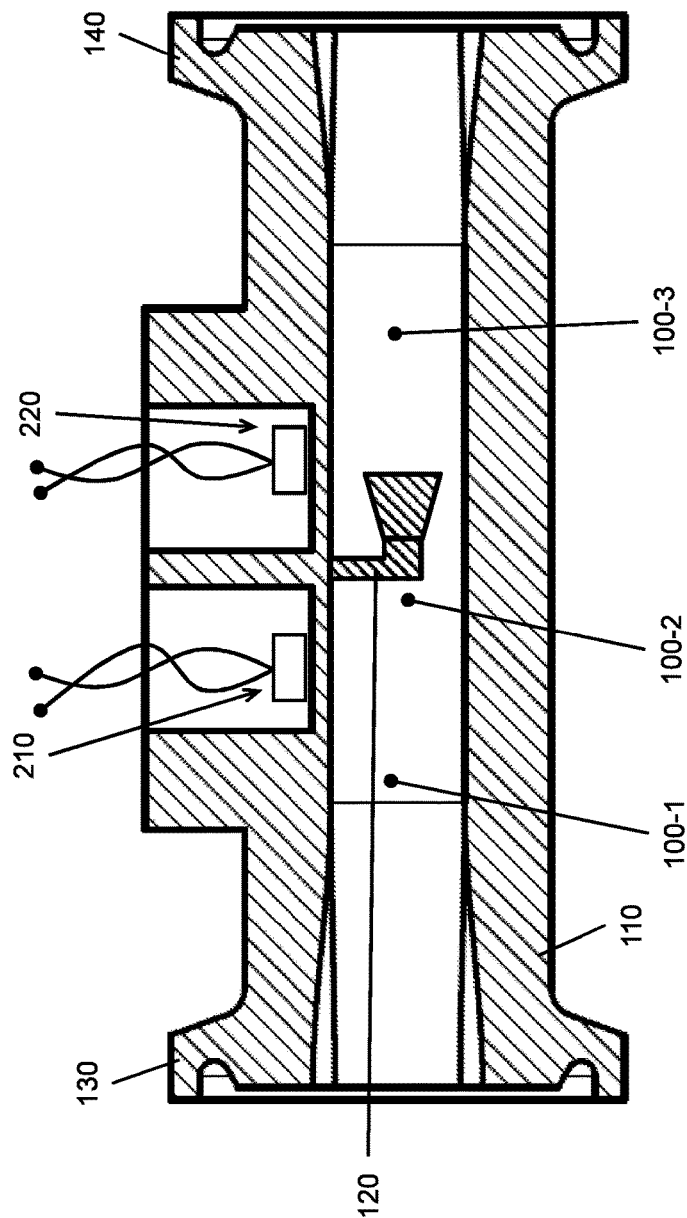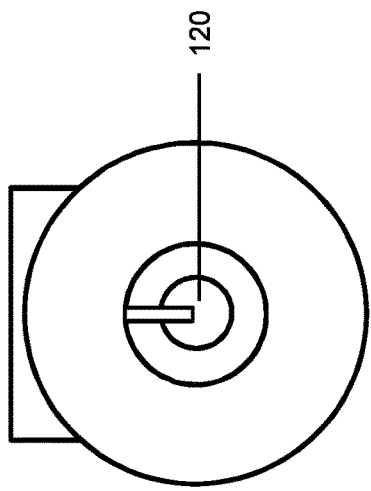
*FIG. 7A*
*FIG. 7B*

MEASURING SYSTEM AND METHOD FOR MEASURING A MEASUREMENT VARIABLE OF A FLOWING FLUID

CROSS-REFERENCE TO RELATED APPLICATIONS

The present application is related to and claims the priority benefit of German Patent Application No. 10 2018 110 456.1, filed on May 2, 2018 and International Patent Application No. PCT/EP2019/059253, filed on Apr. 11, 2019, the entire contents of which are incorporated herein by reference.

TECHNICAL FIELD

The invention relates to a measuring system and to a method for measuring at least one measurement variable changeable as a function of time, for example, a flow velocity, a volume flow rate, a pressure, a pressure difference, or a density, of a fluid flowing along a flow path with a predetermined flow direction.

BACKGROUND

Used for measuring in process-measuring- and automation technology are measuring systems often embodied as vortex-flow measuring devices or as pressure difference-flow measuring devices for measuring measurement variables changeable as a function of time, for example, a flow velocity, a volume flow rate, a pressure or a density, of fluid flowing with a predetermined flow direction on a flow path formed, for example, by means of a pipeline. Examples of such measuring systems are disclosed in, among others, JP-A 0682281, US-A 2007/0084298, US-A 2011/0247423, US-A 2017/0328750, WO-A 00/34744, WO-A 2008/061551, WO-A 2009/012230, WO-A 2009/089438, WO-A 2009/158605, WO-A 2010/128289, WO-A 2012/118690, WO-A 2013/174956, WO-A 2013/180843, WO-A 2014/149203, WO-A 2015/049488, WO-A 2016/053492, WO-A 2017/049782, WO-A 2018/016984, WO-A 95/08758, WO-A 98/50761 and German patent applications DE102017012067.6, or DE102017012066.8 not published as of the earliest filing date claimed for the present invention.

Such measuring systems have typically a measuring transducer serving for registering pressure fluctuations in the flowing fluid, for example, for registering pressure fluctuations in a Kármán vortex street formed in the flowing fluid, and/or for registering a pressure drop arising in the flowing fluid, as well as a transmitter electronics electrically coupled therewith and adapted to receive and to process sensor signals generated by means of the measuring transducer, especially to generate measured values representing the at least one flow parameter. The measuring transducer is, in turn, formed by means of a tube arrangement inserted into the course of a pipeline (for example, a pipeline formed as a component of a heat supply network or a turbine loop), forming portions of the flow path, and serving for conveying the fluid to be measured-, for example, a monolithic tube arrangement or one composed of individual parts—as well as sensor arrangements appropriately mounted thereon. The tube arrangement includes a—most often metal—tube wall, a lumen surrounded thereby and equally as well forming a first portion of the flow path, a second portion of the flow path located in the flow direction downstream of the first portion as well as a third portion of the flow path located in the flow direction downstream of the second portion, as well as a flow obstruction arranged at least partially in the lumen—for example, also fixedly connected therewith to an inside of the tube wall facing the lumen—and, consequently, flowed around-, or through, by fluid during operation. The flow obstruction serves, especially, to bring about a desired disturbance in the flowing fluid, for example, a desired disturbance dependent on the at least one measurement variable, or serving as a measurable effect dependent on the at least one measurement variable.

In the case of the measuring transducers, or the measuring system formed therewith, disclosed in JP-A 0682281 and WO-A 2018/016984, the flow obstruction is embodied as a prismatically formed bluff body, or the flow obstruction is adapted to induce in the fluid flowing past vortices having a shedding rate ($1/f_{V_{tx}}$) dependent on the flow velocity of the fluid, in such a manner that a Kármán vortex street is formed in the fluid flowing downstream of the flow obstruction. Alternatively, the flow obstruction can, such as shown, among others, also in US-A 2017/0328750, US-A 2007/0084298, WO-A 2005/033634, WO-A 2008/061551, WO-A 2009/158605, WO-A 2013/180843 and WO-A 2015/049488, for example, also be adapted to increase a flow velocity of a fluid flowing past- and/or through and/or to lessen a static pressure reigning in a fluid flowing past- and/or through and/or to bring about along a measuring path formed by means of the first and second subsegments of the tube wall a pressure difference dependent on a volume flow. For such purpose, the second portion, or the flow obstruction, can, for example, be embodied as a (supercritical) nozzle, a cone or a diaphragm, for example, as a standard diaphragm, or, such as shown in US-A 2007/0084298, be formed by means of a vibronic measuring transducer comprising two or more tubes as well as a line branching connected thereto on the inlet side and a line junction connected thereto on the outlet side.

For the purpose of generating the sensor signals, each of the above described measuring systems includes, furthermore, at least two—typically equally constructed—sensor arrangements, of which a first sensor arrangement is positioned in the above-referenced first portion located in front of the flow obstruction and a second sensor element is positioned at least partially in the above-referenced third portion located downstream of the flow obstruction. Each of the sensor arrangements is adapted to produce at least one—typically electrical—sensor signal, which has a frequency spectrum influenced by the fluid flowing within its portion; this, especially, in such a manner that at least the frequency spectrum of the sensor signal delivered by the second sensor arrangement contains at least one wanted component, namely a spectral signal component influenced by the at least one measurement variable as regards at least one signal parameter. In the case of the measuring system shown in JP-A 0682281, WO-A 2018/016984 WO-A 2009/158605, the above-mentioned second sensor arrangement serves, in each case, especially to register pressure fluctuations in the Kármán vortex street formed in the flowing fluid and to transduce such into a sensor signal representing the pressure fluctuations and having a wanted component corresponding to a pressure reigning within the fluid and subjected to periodic fluctuations as a result of opposed vortices downstream of the bluff body, thus having a signal frequency ($\sim f_{V_{tx}}$) corresponding to the shedding rate of the vortices. Both due to the measuring principle as well as also due to possible disturbances, measuring systems of the above described type can have sensor signals, especially, however, also the second sensor signal containing the actual wanted component, which are naturally multispectral and, additionally, comparatively broadbanded; this, especially, also in such a manner that the second sensor signal within a frequency interval expectedly containing the wanted component contains other significant spectral signal components, e.g. spectral signal components having higher signal level than the wanted component.

For processing the at least two sensor signals, especially for their digitizing and for recurring calculating of measured values representing the measurement variable, for example, based on digital sampling sequences won from the at least two sensors signals, each of the above described measuring systems comprises, furthermore, a transmitter electronics formed, for example, by means of at least one microprocessor. The transmitter electronics is typically accommodated in a robust, most often also impact-, pressure-, and/or explosion resistant, or hermetically sealed, electronics housing, which can be mounted, for example, directly on the tube arrangement to form a prefabricated measuring system in compact construction. Additionally, the measuring electronics can be coupled, for example, via corresponding electrical lines and/or via radio connection, to a superordinated electronic data processing system spatially remote from the measuring system and most often also spatially distributed, for example, a programmable logic controller (PLC) and/or a process control system (PCS), which serves for control and/or monitoring of a plant containing the pipeline and to which the measured values produced, especially also in real time, by the measuring system are forwarded, near in time, by means of a measured value signal, for example, also a digital measured value signal, correspondingly carrying the measured values. For displaying the measured values, and, in given cases, also other operating data of the measuring system, as well as for servicing the measuring system on-site, the measuring system can, furthermore, in given cases, also be provided with a display- and service unit communicating with the transmitter electronics.

In the case of the measuring system shown in WO-A 2018/016984, it is also provided to subject the two sensor signals to a frequency analysis, for example, by means of a fast Fourier transformation (FFT) executed in the transmitter electronics, in order based thereon to be able to eliminate disturbances entered into the flow in front of the first portion and, thus, to filter the wanted component in the second sensor signal as exactly as possible. Such disturbances can be, e.g., pressure pulsations in the flowing fluid coming from a pump, or, however, for example, also vibrations of the pipeline.

A disadvantage of such frequency analysis based on a discrete Fourier transformation is, among others, to be seen therein that due to the uncertainty principle burdening the discrete Fourier transformation, the speed, with the two sensor signals can, in each case, be processed with a given amount of computing power in the transmitter electronics, is lower, the higher the frequency resolution is selected, with which the spectral components of the sensor signals can be registered. Equally in the case of measuring systems of the type being discussed, not least of all due to the naturally high dynamic range of the measured variable, most often also high updating speeds are pursued, and required, for the measured values.

SUMMARY

Taking this into consideration, an object of the invention is to provide a method, and a corresponding measuring system, with which sensor signals of the above described type can be processed faster and more precisely, in such a manner that the wanted component corresponding to the measurement variable can be very rapidly and very exactly collected by filtering from the sensor signal.

For achieving the object, the invention resides in a measuring system for measuring at least one measurement variable changeable as a function of time, for example, a flow velocity, a volume flow rate, a pressure, a pressure difference, or a density, of a fluid flowing along a flow path with a predetermined flow direction, which measuring system comprises:

a tube arrangement, for example, a tube arrangement insertable into the course of a pipeline and/or embodied as a component of a pipeline, with a lumen forming a first portion of the flow path, a second portion of the flow path located in the flow direction downstream of the first portion as well as a third portion of the flow path located in the flow direction downstream of the second portion, with a tube wall surrounding the lumen, for example, a metal and/or monolithic tube wall, and with a flow obstruction arranged within the tube arrangement in the second portion of the flow path, for example, fixedly connected therewith to an inside of the tube wall facing the lumen, for effecting a disturbance in the flowing fluid—for example, a disturbance dependent on the at least one measurement variable and/or serving as a measurable effect dependent on the at least one measurement variable;

a first sensor arrangement (for example, a first sensor arrangement arranged at least partially at the first portion and/or at least partially within the first portion), which is adapted to produce at least a first sensor signal, which has a first frequency spectrum influenced by the fluid flowing within the first portion;

a second sensor arrangement (for example, a second sensor arrangement arranged at least partially at the third portion and/or at least partially within the third portion and/or embodied equally to the first sensor arrangement), which is adapted to produce at least a second sensor signal, which has a second frequency spectrum influenced by the fluid flowing within the third portion-, for example, a second frequency spectrum deviating from the first frequency spectrum and/or containing at least one wanted component, namely a spectral signal component influenced by the at least one measurement variable as regards at least one signal parameter-; as well as a transmitter electronics, for example, a transmitter electronics formed by means of at least one microprocessor. The transmitter electronics of the measuring system of the invention is adapted, especially, both to receive the first sensor signal and to convert such into a first sensor signal-sampling sequence approximating the first sensor signal, namely a sequence of digital sampled values won with, for example, constant, sampling rate from the first sensor signal at different, for example, time equidistant, sampling points in time, as well as also to receive the second sensor signal and to convert such into a second sensor signal-sampling sequence approximating the second sensor signal, namely a sequence of digital sampled values won with, for example, constant, sampling rate from the second sensor signal at different, for example, time equidistant, sampling points in time, for example, in such a manner that the second sensor signal-sampling sequence approximates at least one wanted component, namely a spectral signal component of the second sensor signal influenced by the at least one measurement variable. Additionally, the transmitter electronics of the measuring system of the invention is adapted by means of a digital adaptive filter to ascertain from the first sensor signal-sampling sequence a wanted signal filter coefficients-set, namely a set of filter coefficients, as well as by means of the wanted signal filter coefficients-set to form a z-transfer function of a wanted signal filter, namely a digital filter serving for filtering the second sensor signal sampling sequence, namely in such a manner that the z-transfer function of the wanted signal filter is determined by the wanted signal filter coefficients set. Moreover, the transmitter electronics of the measuring system of the invention is also adapted by means of the wanted signal filter as well as by means of the second sensor signal sampling sequence to produce a wanted signal sequence, namely a sequence of digital function values calculated by means of the wanted signal filter from the second sensor signal sampling sequence, as well as to produce from the wanted signal sequence a measured values sequence, namely a sequence of digital measured values representing the at least one measurement variable and following one after the other in time.

Moreover, the invention resides additionally also in a method, for example, also performed by means of the above described measuring system of the invention and/or serving for the setup, or start up, of the measuring system, for measuring at least one measurement variable changeable as a function of time, for example, a flow velocity, a volume flow rate, a pressure or a density, of a fluid flowing with a predetermined flow direction along a flow path formed, for example, by means of a pipeline or within a lumen of a tube of a measurement transducer, wherein the flow path has a first portion, a second portion located in the flow direction downstream of the first portion as well as a third portion located in the flow direction downstream of the second portion, and wherein within the second portion a flow obstruction is embodied for effecting a disturbance in the flowing fluid—for example, a disturbance dependent on the at least one measurement variable and/or serving and/or desired as a measurable effect dependent on the at least one measurement variable—which method comprises:

permitting fluid to flow along the flow path, in such a manner that volume portions of the fluid following one after the other flow, firstly, to the first portion, further to the second portion and further to the third portion and by means of the flow obstruction embodied within the second portion a disturbance is effected in the flowing fluid—for example, a disturbance dependent on the at least one measurement variable and/or serving as a measurable effect dependent on the at least one measurement variable;

producing at least a first sensor signal, which has a first frequency spectrum influenced by the fluid flowing within the first portion;

converting the first sensor signal into a first sensor signal sampling sequence approximating the first sensor signal, namely a sequence of digital sampled values won with, for example, constant, sampling rate from the first sensor signal at different, for example, time equidistant, sampling points in time;

producing at least a second sensor signal, which has a second frequency spectrum influenced by the fluid flowing within the second portion and/or within the third portion, for example, a second frequency spectrum deviating from the first frequency spectrum and/or containing at least one wanted component, namely a spectral signal component influenced by the at least one measurement variable, or the disturbance, as regards at least one signal parameter;

converting the second sensor signal into a second sensor signal sampling sequence approximating the second sensor signal, namely a sequence of digital sampled values won with, for example, constant, sampling rate from the second sensor signal at different, for example, time equidistant, sampling points in time, for example, in such a manner that the second sensor signal sampling sequence approximates at least one wanted component, namely a spectral signal component of the second sensor signal influenced by the at least one measurement variable;

using the first sensor signal sampling sequence and a digital adaptive filter, for example, a linear prediction filter (LPE—linear prediction filter), for ascertaining from the first sensor signal sampling sequence at least one wanted signal filter coefficients-set, namely a set of N filter coefficients, for example, at least five (N≥5) filter coefficients and/or filter coefficients at least partially differing from one another;

using the wanted signal filter coefficients-set for forming a z-transfer function of a wanted signal filter, namely a digital filter (for example, a digital filter having a finite pulse response) serving for filtering the second sensor signal sampling sequence, in such a manner that the z-transfer function of the wanted signal filter is determined by the wanted signal filter coefficients-set;

using the second sensor signal sampling sequence and the wanted signal filter for producing a wanted signal sequence, namely a sequence of digital function values calculated from the second sensor signal sampling sequence by means of the wanted signal filter; as well as producing from the wanted signal sequence a measured values sequence, namely a sequence of digital measured values representing the at least one measurement variable and following one after the other in time.

In a first embodiment of the measuring system of the invention, the transmitter electronics is adapted to ascertain the filter coefficients $w_k$ of the wanted signal filter coefficients set W by means of an LMS algorithm and/or by means of an RMS algorithm.

In a second embodiment of the measuring system of the invention, it is, furthermore, provided that the transmitter electronics has a memory, for example, a non-volatile memory, which is adapted to store at least the filter coefficients of the wanted signal filter coefficients set.

In a third embodiment of the measuring system of the invention, the transmitter electronics is adapted to calculate, for example, also recurringly, a transversal filter coefficients set, namely a set of filter coefficients determining a z-transfer function of a transversal filter of the digital adaptive filter.

In a fourth embodiment of the measuring system of the invention, the transmitter electronics is adapted to ascertain the wanted signal filter coefficients set for the wanted signal filter from the transversal filter coefficients set of the transversal filter, especially to incorporate the transversal filter coefficients set into the wanted signal filter coefficients sets.

In a fifth embodiment of the measuring system of the invention, it is, furthermore, provided that the digital adaptive filter is adapted to generate from the first sensor signal sampling sequence an estimated signal sequence, namely a sequence of digital function values calculated from the first sensor signal sampling sequence, for example, by means of a digital transversal filter, for example, in such a manner that the estimated signal sequence is at least at times equal to or at least approximately equal to the first sensor signal sampling sequence, or has a minimum of least squares residuals from the first sensor signal sampling sequence.

In a sixth embodiment of the measuring system of the invention, the transmitter electronics is adapted to ascertain a frequency of the wanted component based on the wanted signal sequence.

In a seventh embodiment of the measuring system of the invention, it is, furthermore, provided that the transmitter electronics is adapted to ascertain a flow velocity and/or a volume flow rate of the fluid based on a frequency of the wanted component won, for example, from the wanted signal sequence.

In an eighth embodiment of the measuring system of the invention, it is, furthermore, provided that the second portion, or the flow obstruction formed therewith, is adapted to increase a flow velocity of a fluid flowing past- and/or through and/or to lessen a static pressure reigning in a fluid flowing past- and/or through and/or to provide a volume flow dependent pressure difference along a measuring path formed by means of the first, second and third portions.

In a ninth embodiment of the measuring system of the invention, it is, furthermore, provided that the second portion, or the flow obstruction formed therewith, is adapted to induce vortices in fluid flowing past, for example, in such a manner that a Kármán vortex street is formed in the fluid flowing downstream of the flow obstruction.

In a tenth embodiment of the measuring system of the invention, it is, furthermore, provided that the flow obstruction is formed by means of a diaphragm, for example, a standard diaphragm.

In an eleventh embodiment of the measuring system of the invention, it is, furthermore, provided that the flow obstruction is formed by means of a bluff body, for example, a prismatically formed bluff body.

In a twelfth embodiment of the measuring system of the invention, it is, furthermore, provided that the flow obstruction is formed by means of a nozzle, for example, a supercritical nozzle.

In a thirteenth embodiment of the measuring system of the invention, it is, furthermore, provided that the first sensor arrangement is formed by means of a pressure sensor, for example, a pressure sensor only positioned in the first portion, for example, a capacitive pressure sensor.

In a fourteenth embodiment of the measuring system of the invention, it is, furthermore, provided that the second sensor arrangement is formed by means of a pressure sensor positioned at least partially in the third portion, for example, a capacitive pressure sensor.

In a fifteenth embodiment of the measuring system of the invention, it is, furthermore, provided that the first sensor arrangement is formed by means of a microphone, for example, a microphone positioned only in the first portion, for example, a capacitive and/or inductive microphone, for example, a dynamic microphone, a piezo microphone or a high frequency capacitor microphone.

In a sixteenth embodiment of the measuring system of the invention, it is, furthermore, provided that the second sensor arrangement is formed by means of a microphone at least partially positioned at the third portion, for example, a capacitive and/or inductive microphone, for example, a dynamic microphone, a piezo microphone or a high frequency capacitor microphone.

In a seventeenth embodiment of the measuring system of the invention, it is, furthermore, provided that the second sensor arrangement is formed by means of a sensor paddle protruding into the third portion.

In an eighteenth embodiment of the measuring system of the invention, it is, furthermore, provided that the first sensor arrangement is formed by means of two ultrasonic transducers, in each case, for example, positioned only at the first portion.

In a nineteenth embodiment of the measuring system of the invention, it is, furthermore, provided that the second sensor arrangement is formed by means of two ultrasonic transducer positioned at least partially at the third portion.

In a twentieth embodiment of the measuring system of the invention, it is, furthermore, provided that the second portion has a bluff body, for example, a prismatically formed bluff body.

In a twenty-first embodiment of the measuring system of the invention, it is, furthermore, provided that the second portion has a diaphragm, for example, a standard diaphragm.

In a twenty-second embodiment of the measuring system of the invention, it is, furthermore, provided that at least the second portion is formed by means of a vibronic measuring transducer, for example, a vibronic measuring transducer comprising two or more tubes and/or a line branching and/or a line junction.

In a twenty-third embodiment of the measuring system of the invention, it is, furthermore, provided that a smallest distance between the first and third portions amounts to greater than 3-times a smallest caliber of the tube arrangement.

In a twenty-fourth embodiment of the measuring system of the invention, it is, furthermore, provided that a smallest distance between the first and third portions amounts to less than 10-times a greatest caliber of the tube arrangement.

In a twenty-fifth embodiment of the measuring system of the invention, it is, furthermore, provided that the transmitter electronics is electrically connected both with the first sensor arrangement as well as also with the second sensor arrangement.

In a first embodiment of the method of the invention, it is, furthermore, provided that the filter coefficients $w_k$ of the wanted signal filter coefficients set are ascertained by means of an LMS algorithm (Least-Mean-Squares algorithm) and/or by means of an RMS algorithm (recursive-least-squares algorithm).

In a second embodiment of the method of the invention, it is, furthermore, provided that the wanted signal filter coefficients set, or the wanted signal filter formed therewith, contains five or more ($N \geq 5$) for example, greater than 10 ($N > 10$), filter coefficients.

In a third embodiment of the method of the invention, it is, furthermore, provided that the sampling rate of the first sensor signal sampling sequence and the sampling rate of the second sensor signal sampling sequence are equally large.

In a fourth embodiment of the method of the invention, it is, furthermore, provided that the digital adaptive filter comprises a transversal filter, namely a digital filter having a z-transfer function determined by a transversal filter coefficients set, namely a set of M filter coefficients, for example, a digital filter having a finite pulse response. Developing this embodiment of the method of the invention further, such additionally comprises: ascertaining the wanted signal filter coefficients set for the wanted signal filter from the transversal filter coefficients set of the transversal filter, for example, in such a manner that the wanted signal filter coefficients set contains all filter coefficients of the transversal filter coefficients set, and/or using the transversal filter as well as the first sensor signal sampling sequence for producing an estimated first signal sequence, namely a sequence of digital function values calculated from the first sensor signal sampling sequence by means of the digital transversal filter. The transversal filter coefficients set can, for example, be ascertained in such a manner that the estimated signal sequence of the first sensor signal sampling sequence approximates, or predicts, namely equals or at least approximately equals, the first sensor signal sampling sequence and/or has a minimum of least squares residuals (BLUP—Best Linear Unbiased Prediction) from the first sensor signal sampling sequence. Additionally, the wanted signal filter coefficients set for the wanted signal filter can be ascertained from the transversal filter coefficients set of the transversal filter, for example, when, in given cases, also only when, the estimated signal sequence for a predetermined sampling-, or time, interval, equals or at least approximately equals the first sensor signal sampling sequence, for example, has a minimum of least squares residuals (BLUP—Best Linear Unbiased Prediction) from the first sensor signal sampling sequence.

In a fifth embodiment of the method of the invention, it is, furthermore, provided that the digital adaptive filter comprises a transversal filter, namely a digital filter having a z-transfer function determined by a transversal filter coefficients set, namely a set of M filter coefficients, for example, a digital filter having a finite pulse response, and that the wanted signal filter coefficients set contains all filter coefficients of the transversal filter coefficients set, for example, also in such a manner that each filter coefficient of the transversal filter coefficients set is used as filter coefficient of the wanted signal filter coefficients set, and/or that the wanted signal filter coefficients set, or the wanted signal filter formed therewith contains a filter coefficient different from zero, for example, also negative and/or predetermined filter coefficient, which the transversal filter coefficients set, or the transversal filter formed therewith, does not contain.

In a sixth embodiment of the method of the invention, it is, furthermore, provided that the digital adaptive filter comprises a transversal filter, namely a digital filter having a z-transfer function determined by a transversal filter coefficients set, namely a set of M filter coefficients, for example, a digital filter having a finite pulse response, and that the transversal filter coefficients set W1, or the transversal filter formed therewith, contains five or more, for example, also greater than 10, filter coefficients.

In a seventh embodiment of the method of the invention, it is, furthermore, provided that the digital adaptive filter comprises a transversal filter, namely a digital filter having a z-transfer function determined by a transversal filter coefficients set, namely a set of M filter coefficients, for example, a digital filter having a finite pulse response, and the filter coefficients of the transversal filter coefficients set are ascertained by means of an LMS algorithm (Least-Mean-Squares algorithm) and/or by means of an RMS algorithm (recursive-least-squares algorithm).

In an eighth embodiment of the method of the invention, it is, furthermore, provided that the second sensor signal contains at least one wanted component, namely a spectral signal component influenced by the at least one measurement variable as regards at least one signal parameter, for example, an amplitude, a frequency or a phase angle. Developing this embodiment of the method of the invention, it is, furthermore, provided that also the second sensor signal sampling sequence contains, or approximates, the at least one wanted component, for example, also the wanted signal sequence contains, or approximates, at least the wanted component.

In a ninth embodiment of the method of the invention, it is, furthermore, provided that at least two of the filter coefficients $w_k$ of the wanted signal filter coefficients set W differ from one another; and/or In a tenth embodiment of the method of the invention, it is, furthermore, provided that effecting the disturbance in the fluid flowing through the second portion comprises an increasing of a flow velocity of the fluid flowing within the second portion.

In an eleventh embodiment of the method of the invention, it is, furthermore, provided that effecting the disturbance in the fluid flowing through the second portion comprises a lessening of a static pressure reigning in the fluid flowing within the second portion.

In a twelfth embodiment of the method of the invention, it is, furthermore, provided that effecting the disturbance in the fluid flowing through the second portion comprises providing a pressure gradient within the fluid flowing along the flow path dependent on a volume flow.

In a thirteenth embodiment of the method of the invention, it is, furthermore, provided that effecting the disturbance in the fluid flowing through the second portion comprises inducing vortices in the fluid flowing within the second portion, for example, forming a Kármán vortex street in the fluid flowing downstream of the flow obstruction.

In a fourteenth embodiment of the method of the invention, it is, furthermore, provided that the first sensor arrangement is formed by means of a pressure sensor positioned at the first portion.

In a fifteenth embodiment of the method of the invention, it is, furthermore, provided that the second sensor arrangement is formed by means of a pressure sensor positioned at the second and/or third portion.

In a sixteenth embodiment of the method of the invention, it is, furthermore, provided that the second sensor arrangement is formed by means of a sensor paddle protruding into the third portion.

In a seventeenth embodiment of the method of the invention, it is, furthermore, provided that the first sensor arrangement is formed by means of at least one sound transducer, especially an ultrasonic transducer, positioned at the first portion.

In an eighteenth embodiment of the method of the invention, it is, furthermore, provided that the second sensor arrangement is formed by means of at least one sound transducer, especially an ultrasonic transducer, positioned at the second and/or third portions.

In a nineteenth embodiment of the method of the invention, it is, furthermore, provided that the second portion has a bluff body.

In a twentieth embodiment of the method of the invention, it is, furthermore, provided that the second portion has a diaphragm, especially a standard diaphragm.

In a twenty-first embodiment of the method of the invention, it is, furthermore, provided that the second portion is formed by means of a tube arrangement of a vibronic measuring transducer, especially a tube arrangement comprising two or more tubes and/or a line branching and/or a line junction.

In a first further development of the method of the invention, such additionally comprises: a replacing, for example, also a recurring and/or cyclic replacing, of a wanted signal filter coefficients set, firstly, determining the z-transfer function of the wanted signal filter, for example, also ascertained earlier from the first sensor signal sampling sequence and/or differing from the wanted signal filter coefficients set, by the wanted signal filter coefficients set.

The replacing of the wanted signal filter coefficients set, firstly, determining the z-transfer function of the wanted signal filter by the wanted signal filter coefficients set can be repeated, for example, also cyclically, with an exchange rate, for example, also in such a manner that the exchange rate is lower than the sampling rate of the first sensor signal sampling sequence and/or is lower than the sampling rate $f_{s2}$ of the second sensor signal sampling sequence.

In a second further development of the method of the invention, such additionally comprises: using a first sensor arrangement, for example, a first sensor arrangement arranged at least partially at the first portion and/or at least partially within the first portion, for producing the first sensor signal as well as using a second sensor arrangement, for example, a second sensor arrangement arranged at least partially at the third portion and/or at least partially within the third portion and/or embodied equally to the first sensor arrangement, for producing the second sensor signal.

In a third further development of the method of the invention, it is, furthermore, provided that the digital adaptive filter comprises a transversal filter, namely a digital filter having a z-transfer function determined by a transversal filter coefficients set, namely a set of M filter coefficients, for example, a digital filter having a finite pulse response. Developing this embodiment of the method of the invention further, such comprises, additionally, ascertaining the wanted signal filter coefficients set for the wanted signal filter from the transversal filter coefficients set of the transversal filter, for example, in such a manner that the wanted signal filter coefficients set contains all filter coefficients of the transversal filter coefficients set, and/or using the transversal filter as well as the first sensor signal sampling sequence for producing an estimated signal sequence, namely a sequence of digital function values calculated by means of the digital transversal filter from the first sensor signal sampling sequence and the method further comprises producing an estimate error sequence, namely a sequence of digital function values representing, in each case, a deviation between a sampling value of the first sensor signal sampling sequence and a function value of the estimated signal sequence approximating the sampling value, for example, in each case, a difference between a sampling value of the first sensor signal sampling sequence and a digital function value representing function value of the estimated signal sequence approximating the sampling value. For producing the estimate error sequence from the first sensor signal sampling sequence, an estimate error function determined by the z-transfer function of digital transversal filter, thus the transversal filter coefficients set, can be used.

A basic idea of the invention is to register disturbances entered in the flowing fluid, possibly from the exterior, namely from outside the measuring system, with the sensor arrangement positioned on the inlet side in the measuring system, firstly, directly, equally as well, largely insulated from the measurable effect generated only downstream thereof and to convert such into a corresponding, first sensor signal containing the external disturbances, in order thereafter to subject the first sensor signal to a signal analysis by means of the adaptive filter, and, as a result of the signal analysis, to tune the wanted signal filter suitably for the second sensor signal then containing both the disturbance as well as also the measurable effect. An advantage of the invention is that the signal analysis delivers "on the fly", namely directly, the set of filter coefficients suitable for current disturbances, wherein the filter coefficients already represent the most dominating spectral signal components of the first sensor signal, or correspond in a measure sufficient for the further measuring to practically a discrete spectral power density (SPD) of the disturbances contained therein. Accordingly, the complex converting of the result of the signal analysis supplementally required in the case of a signal analysis based on a classic Fourier transformation can be omitted. A further advantage of the invention is also that the updating of the adaptive filter, consequently an analysis of the external disturbances, can occur recursively. Accordingly, also both a new set of filter coefficients as well as also an actual need for a further adapting of the wanted signal filter by means of the new set of filter coefficients derived by the adaptive filter can be continuously ascertained.

BRIEF DESCRIPTION OF THE DRAWINGS

The invention as well as advantageous embodiments thereof will now be explained in greater detail based on examples of embodiments shown in the figures of the drawing. Equal, or equally acting or equally functioning features are provided in all figures with equal reference characters; when perspicuity requires or it otherwise appears sensible, reference characters already shown in earlier figures are omitted in subsequent figures. Other advantageous embodiments or further developments, especially also combinations of, firstly, only individually explained aspects of the invention, result, furthermore, from the figures of the drawing and/or from the claims per se.

The figures of the drawing show as follows

FIG. 7a and 7b show, in different, partially sectioned, views, a third variant of a tube arrangement suitable for forming a measuring system of the present disclosure;

DETAILED DESCRIPTION

Figure 3:
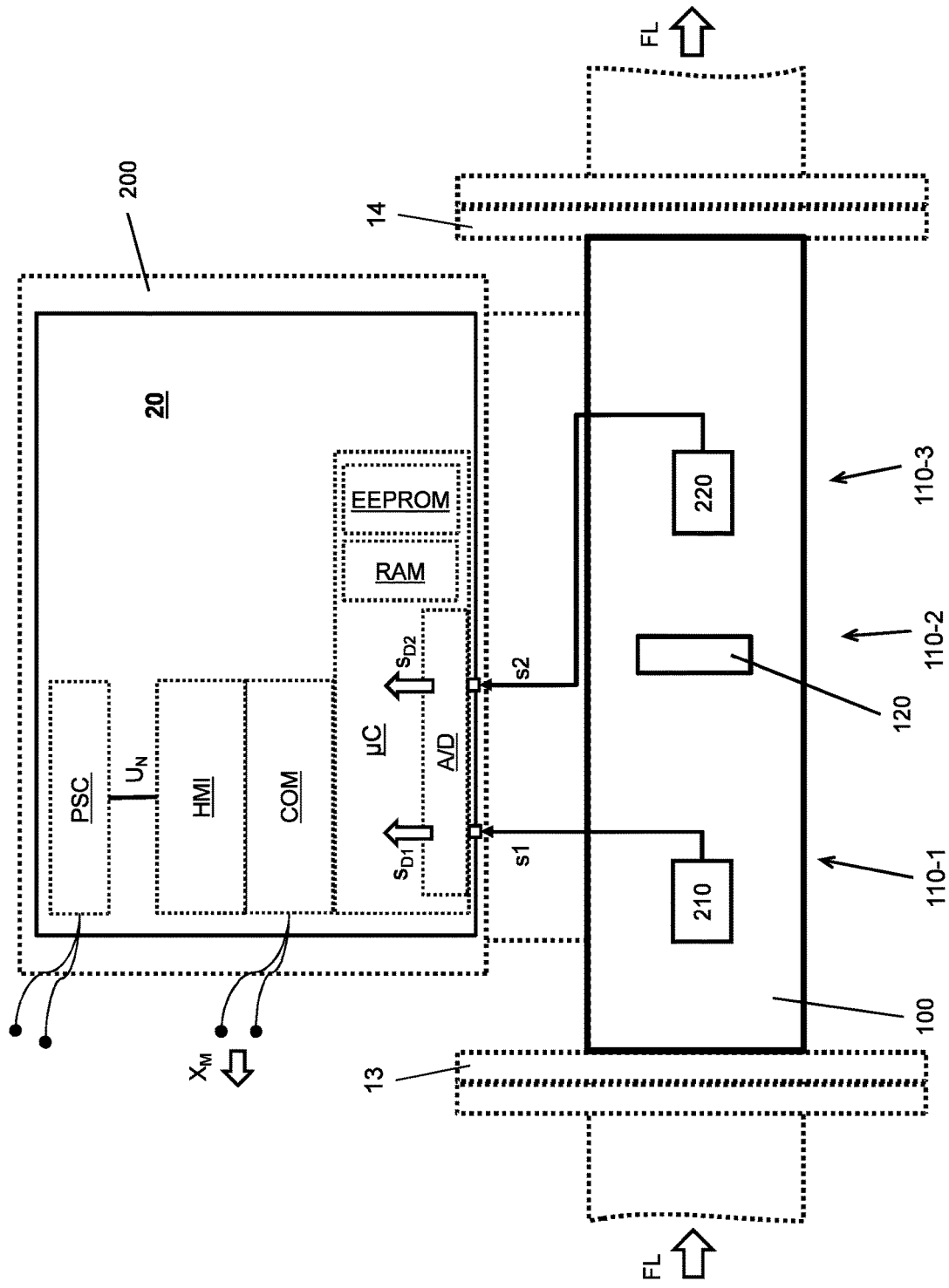
Figure 4:
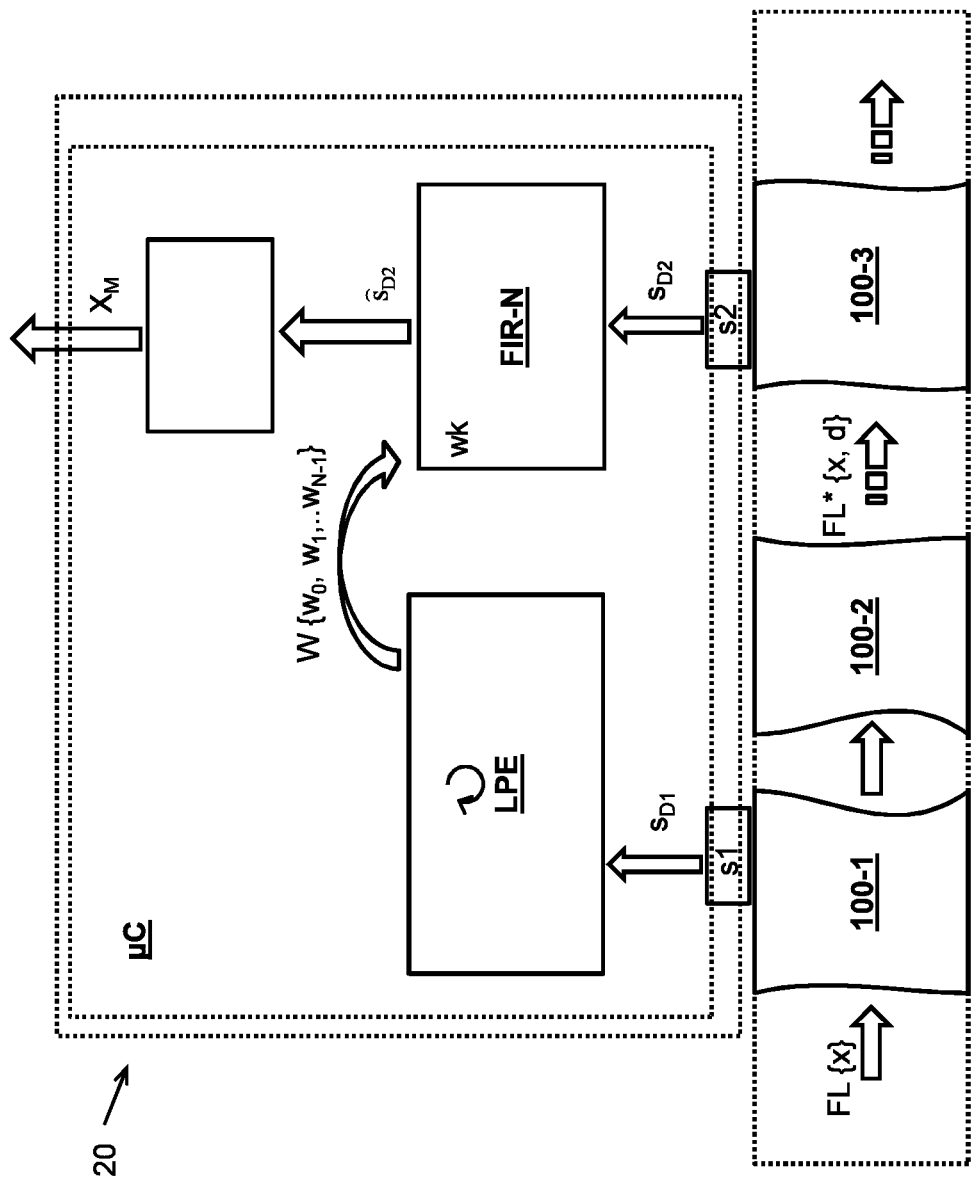
FIG. 4 shows schematically, measuring- and evaluating methods especially executable by means of measuring systems according to FIGS. 1, 2, and 3.

Shown schematically in FIGS. 1, 2, 3, 4, 5a, 5b, 6a, 6b 7a, 7b and 8 are examples of embodiments of measuring systems for measuring at least one measurement variable x, in given cases, also a measurement variable x changeable as a function of time, especially a pressure, a pressure difference, a temperature, a density, a flow parameter such as, e.g., a flow velocity and/or a volume flow rate, of a fluid FL flowing along a flow path with a predetermined flow direction, or a corresponding method (FIG. 4). The flow path can be embodied, for example, by means of a pipeline, or by means of a component of a filling plant, a tank farm, a chemical plant and/or a plant, in which a product is made from a raw or starting material by the application of chemical, physical or biological procedures, a heat supply network, a circulatory system of a turbine or, for example, also a component of a natural- or biogas plant or a gas supply network. Accordingly, the fluid FL can be, for example, an oil, an aqueous liquid, a vapor or, for example, also a condensate drained from a vapor line, or, for example, also hydrogen, nitrogen, oxygen or helium, methane, carbon dioxide, air, phosgene, or, in given cases, also compressed natural- or biogas.

The measuring system of the invention comprises at least one tube arrangement 100 (for example, one insertable into the course of the above mentioned pipeline, or embodied as a component of the same) having a lumen 100*, by means of which, as well as also shown in FIGS. 1, 2, 3, 4, 5*a*, 5*b*, 6*a*, 6*b*, 7*a*, 7*b* and 8, there is formed a first portion 100-1 of the above described flow path, a second portion 100-2 of the flow path located in the flow direction downstream of the first portion 100-1, as well as a third portion 100-3 of the flow path located in the flow direction downstream of the second portion 100-2. Additionally, the tube arrangement 100 includes a tube wall 110 surrounding the lumen 100*, for example, a metal and/or monolithic tube wall 110, as well as a flow obstruction 120 (for example, a flow obstruction 120 fixedly connected to an inside of the tube wall facing the lumen 100* and/or a monolithic flow obstruction 120) arranged within the tube arrangement in the second portion 100-2 of the flow path for effecting a (measuring system internal) disturbance d in the flowing fluid; this, especially, also in such a manner that the disturbance d depends on the at least one measurement variable x (d=f{x}), or can be helpful as a measurable effect dependent on the at least one measurement variable. Tube arrangement 100 can have a single tube or a plurality of tubes guiding the fluid in parallel and/or serially connected. Tube wall 110 and the flow obstruction 120 can, for example, be of the same material, for example, in given cases, a stainless steel or a nickel-based alloy. Alternatively or supplementally, tube wall 110 and flow obstruction 120 can, for example, also be components of one and the same, for example, cast or sintered, monolithic, formed piece. In this way, the tube wall can in advantageous manner be free of joints, which are most often complicated to produce and/or test, or free of undesired or disturbing welded seams on the inside of the tube wall.

Figures 5A, 5B:
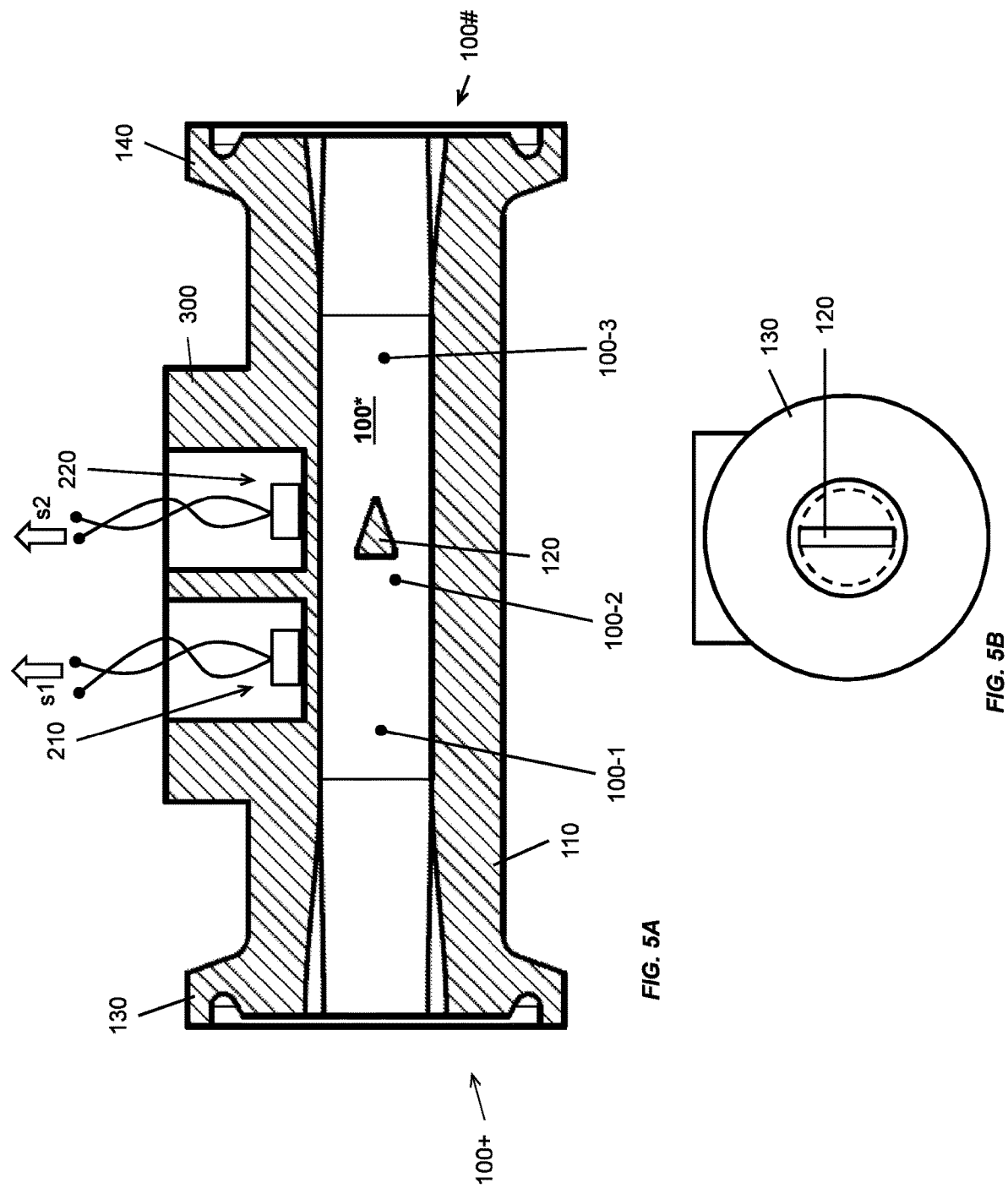
FIG. 5a and 5b show, in different, partially sectioned views, a first variant of a tube arrangement suitable for forming a measuring system of the present disclosure.
Figure 6A:
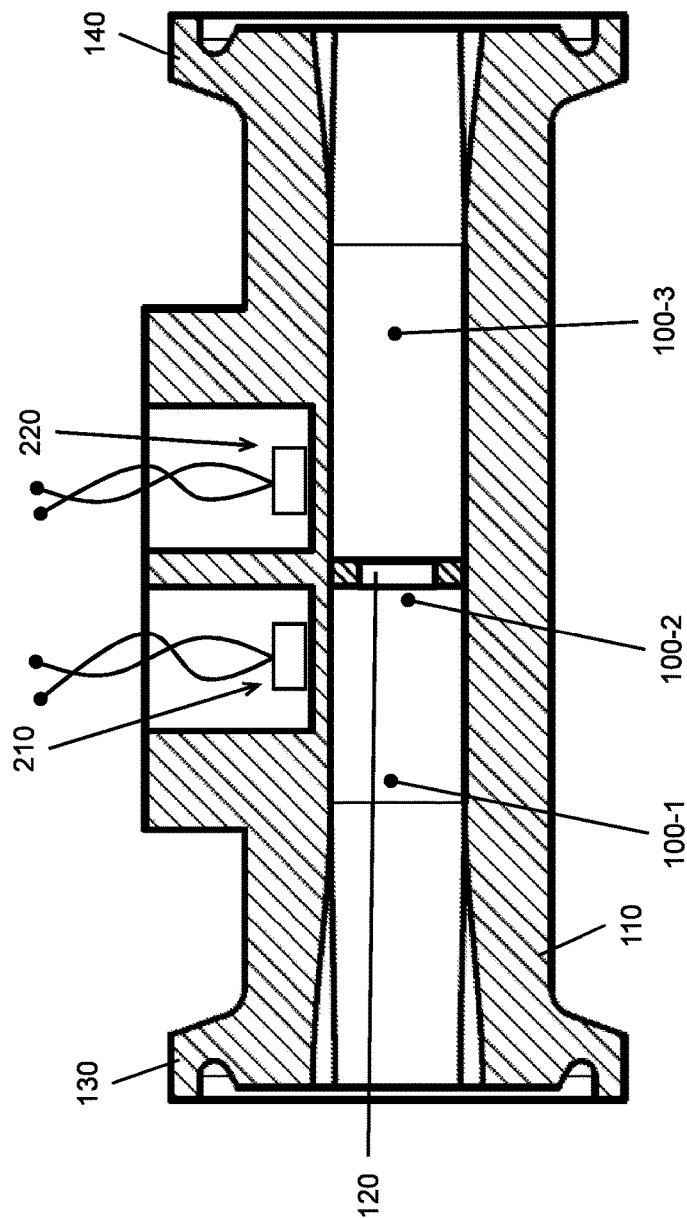
FIG. 6a and 6b show, in different, partially sectioned, views, a second variant of a tube arrangement suitable for forming a measuring system of the present disclosure.
Figure 6B:
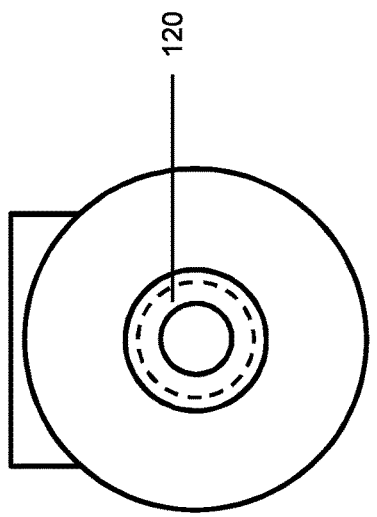
Figure 8:
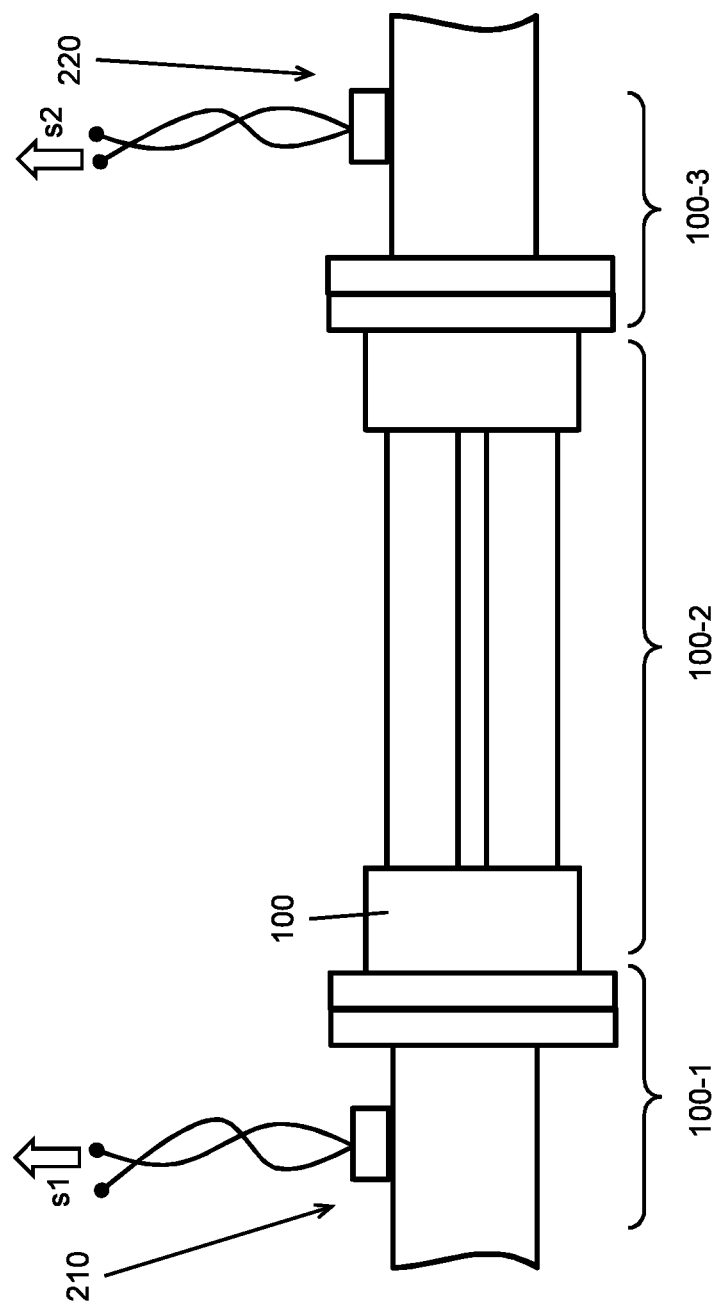
FIG. 8 shows a fourth variant of a tube arrangement suitable for forming a measuring system of the present disclosure.

In an additional embodiment of the invention, the portion 100-2, and the therein embodied flow obstruction 120, are adapted to increase a flow velocity of the fluid flowing through and/or past and/or to lessen a static pressure reigning within the fluid and/or to provide along a measuring path formed by means of the portions 100-1, 100-2, 100-3 a pressure difference dependent on a volume flow and/or pressure fluctuations dependent on flow velocity. For example, the portion 100-2, or the flow obstruction 120 formed therewith, can also be adapted to induce vortices in the fluid flowing past, in such a manner that a Kármán vortex street is formed in the fluid flowing downstream of the flow obstruction 120. The flow obstruction 120 can, as well as also shown schematically in FIGS. 5*a*, 5*b*, 6*a*, 6*b*, 7*a*, 7*b* and 8, accordingly, among other things, also be formed by means of a diaphragm (FIG. 6*a*, 6*b*), for example, a standard diaphragm, by means of a, for example, supercritical, nozzle, by means of a cone (FIG. 7*a*, 7*b*) and/or, for example, a prismatically formed, bluff body (FIG. 5*a*, 5*b*). In another embodiment of the invention, at least the portion 100-2 is formed by means of a vibronic measuring transducer comprising, for example, two or more tubes and/or a line branching and/or a line junction. The measuring transducer can, for example, however, also be a component of a Coriolis-mass flow-measuring device, or a vibronic density-measuring device (FIG. 8). In an additional embodiment of the invention, the portions are, furthermore, so embodied and arranged that, not least of all in order to be able properly to form the above-mentioned disturbance d for the measuring, a smallest distance between the portion 100-1 and the portion 100-3 amounts to greater than 3-times a smallest caliber of the tube arrangement and/or that, for example, in order to be able to form the measuring system as compactly as possible, a smallest distance between the portion 100-1 and the portion 100-3 amounts to less than 10-times a greatest caliber of the tube arrangement.

As shown schematically in FIGS. 1, 2, 3, 4, 5*a*, 5*b*, 6*a*, 6*b*, 7*a*, 7*b* and 8, in each case, or evident from a combination of the figures, the measuring system of the invention comprises, furthermore, an inlet side, first sensor arrangement 210, which is adapted to produce at least one, for example, electrical or optical, first sensor signal s1, which has a first frequency spectrum influenced by the fluid flowing within the portion 100-1, as well as an outlet side, second sensor arrangement 220 (for example, a sensor arrangement 220 of the same type- or construction as sensor arrangement 210), which is adapted to produce at least one, for example, electrical or optical or sensor signal s1 equal type, second sensor signal s2, which has a second frequency spectrum influenced by the fluid flowing within the portion 100-3, especially deviating from the above described, first frequency spectrum of the sensor signal s1; this, especially, in such a manner that the sensor signal s2, or its frequency spectrum, contains at least one wanted component $s_W$—for example, a wanted component $s_W$ not contained in the sensor signal s1-, namely a spectral signal component influenced by the at least one measurement variable x, or the above described disturbance d, as regards at least one signal parameter, for example, an amplitude, a frequency or a phase angle,. Each of the sensor signals s1, s2 can have, for example, an electrical (alternating-)voltage corresponding to the measurement variable x and/or an electrical (alternating-)electrical current corresponding to the measurement variable x. In the above-described case, in which the induced disturbance d is a Kármán vortex street, for example, such a spectral signal component of the sensor signal can serve as wanted component $s_W$, whose signal frequency corresponds to an instantaneous shedding rate of Karman vortex street forming vortices from the flow obstruction 120 embodied by means of the bluff body.

As shown schematically in FIGS. 1, 2, 3, 4, 5*a*, 5*b*, 6*a*, 6*b*, 7*a*, 7*b* and 8, the sensor arrangement 210 can be arranged at least partially directly at the portion 100-1 and/or at least partially within the portion 100-1 and/or the sensor arrangement 220 can be arranged at least partially directly at the portion 100-3 and/or at least partially within the portion 100-3. The sensor arrangement 210 can be formed, for example, by means of a conventional, first, physical to electrical-transducer element, in given cases, also only positioned at the portion 100-1, and the sensor arrangement 220 can be formed, for example, by means of a conventional, second, physical to electrical-transducer element, in given cases, only positioned at the portion 100-3. Serving as physical to electrical-transducer element for the sensor arrangement 210, and/or for the sensor arrangement 220, can be, in each case, for example, a capacitive pressure sensor, in given cases, a capacitive and/or inductive microphone, for example, also a dynamic microphone, a piezo microphone and even a high frequency capacitor microphone, and/or a pair of ultrasonic transducers positioned diametrically opposite one another on the tube arrangement. At least for the above-referenced case, in which the flow obstruction 120 is formed by means of a prismatic bluff body, and/or a Karman-type vortex street is formed by means of the flow obstruction 120 in the flowing fluid, for example, also a sensor paddle protruding into the portion 100-3 can serve as physical to electrical-transducer element for the sensor arrangement 220.

Figure 1:
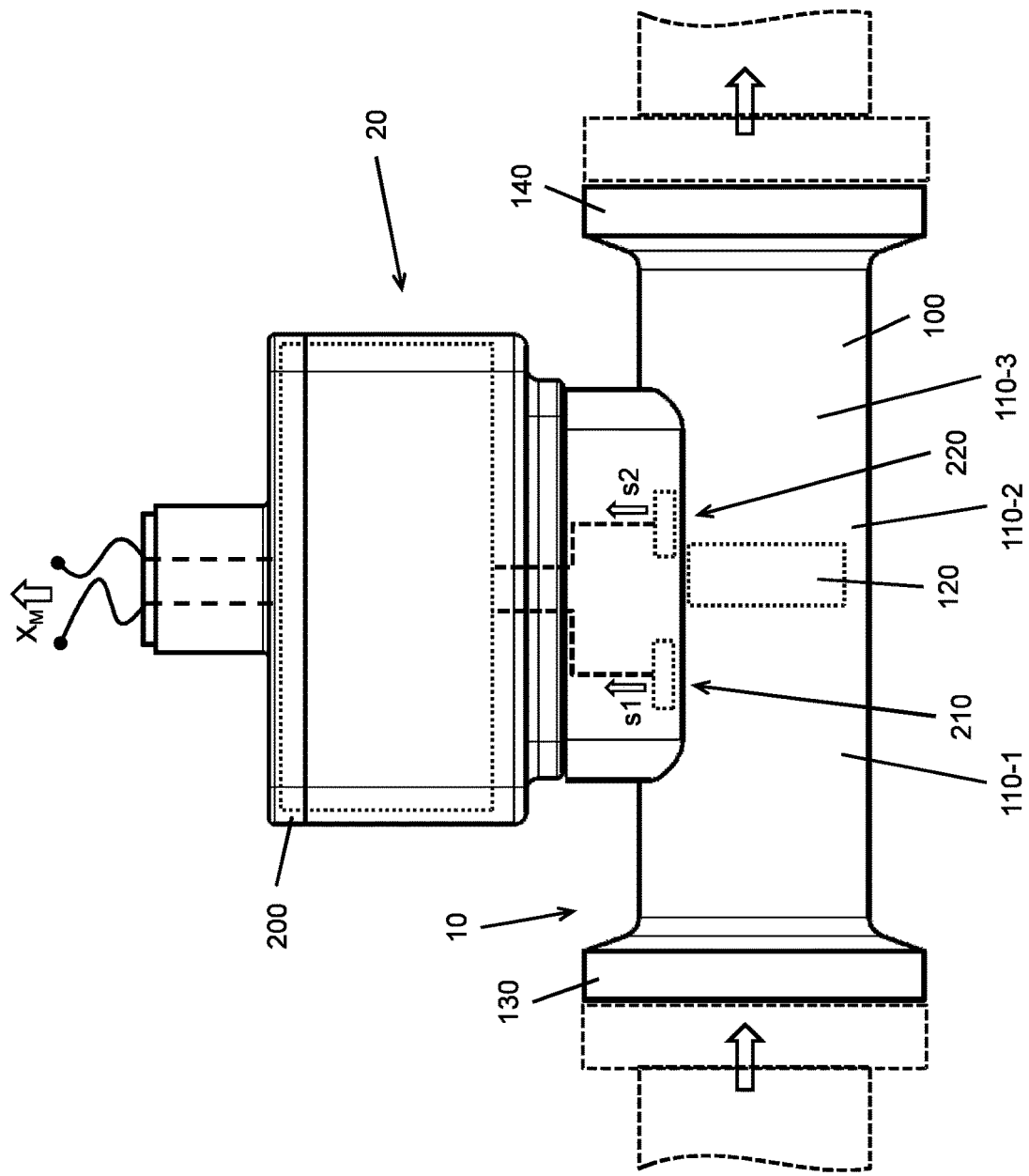
FIGS. 1, 2, and 3 show examples of embodiments of measuring systems of the present disclosure.
Figure 2:
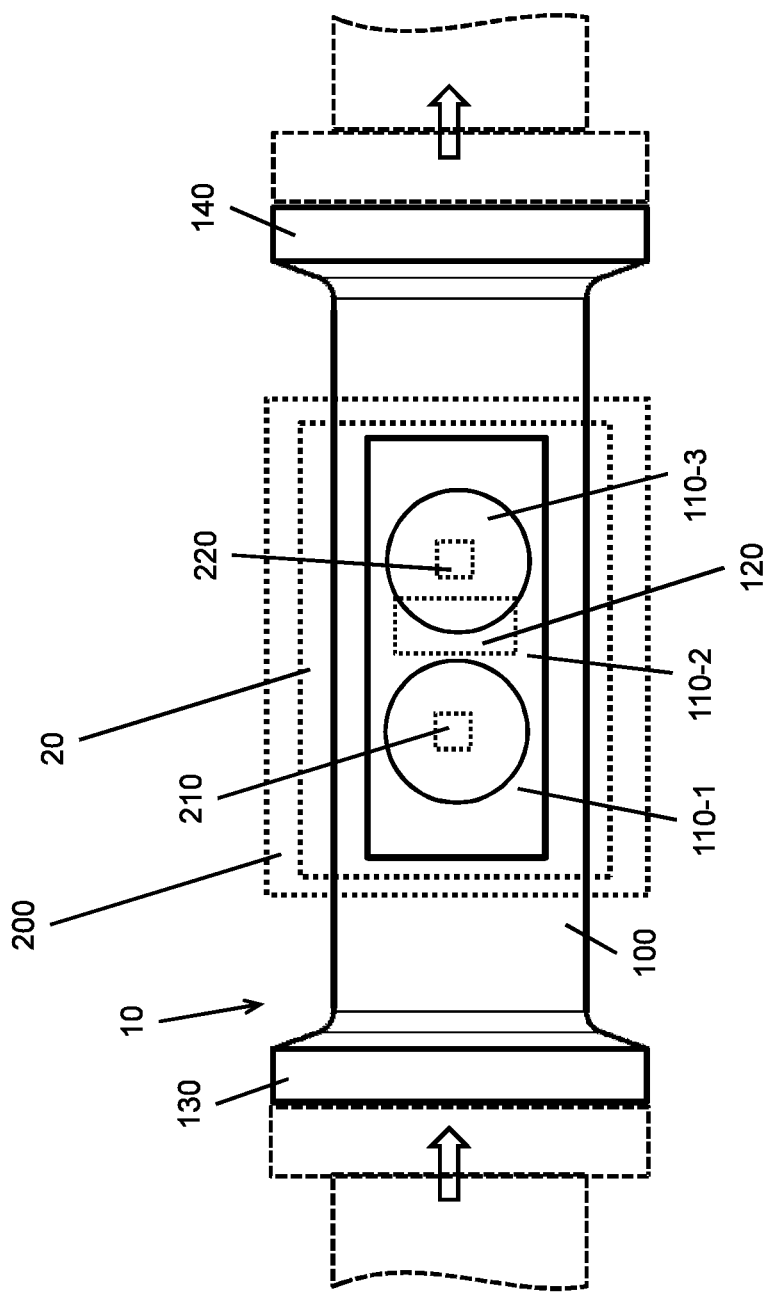

As, among others, evident from FIGS. 1, 2, 3, 4, the measuring system comprises, furthermore, a transmitter electronics 20-, for example, a transmitter electronics 20 contained in an industrial grade, robust, in given cases, also pressure-, or explosion resistant, and/or at least against water spray externally sealed, protective housing 200 and/or formed, for example, by means of at least one microprocessor (μC). Transmitter electronics 20 is electrically connected to the sensor arrangements 210, 220, or communicates at least with the sensor arrangements 210, 220 during operation of the measuring system. The at least two sensors signals s1, s2 can, such as schematically shown in FIGS. 1 and 3, or directly evident from their combination, be fed to the transmitter electronics 20, for example, by means of corresponding connection wires. The above-mentioned protective housing 200 can, for example, be made of a metal, for instance, a stainless steel or aluminum, and/or be produced by means of a casting method, such as e.g. an investment casting- or a pressure casting method (HPDC); it can, however, for example, also be formed by means of a plastic cast part produced in an injection molding method. The measuring system can, as well as also shown in FIGS. 1 and 3, be embodied, for example, also as a prefabricated (for example, by the manufacturer) measuring system in compact construction, consequently also as a self-contained, compact-measuring device, in such a manner that the protective housing 200 together with the transmitter electronics 20 arranged therein is positioned directly on the tube arrangement, in given cases, also quite near to the sensor arrangements 210, 220, and is connected—for example, by means of a neck shaped connection nozzle 300—rigidly, in given cases, also releasably, with the tube arrangement. In accordance therewith, used as measuring system, for example, insertable into the course of the pipeline, consequently ultimately forming a section of the pipeline, can be a prefabricated vortex flow measuring device or, for example, also a prefabricated pressure difference flow measuring device. The measuring system can, thus, at least as regards its mechanical construction, for example, also correspond to those of the above mentioned JP-A 0682281, US-A 2017/0328750, US-A 2011/0247423, US-A 2007/0084298, WO-A 95/08758, WO-A 00/34744, WO-A 2008/061551, WO-A 2009/158605, WO-A 2013/180843, WO-A 2018/016984 or the German patent applications DE102017012067.6, and DE102017012066.8. Alternatively, the protective housing 200 can, for example, however, also be remote from the tube arrangement and be connected by means of corresponding cables with the tube arrangement and the accompanying sensor arrangements.

The transmitter electronics 20 is adapted, furthermore, to receive each of the sensor signals s1, s2 and to process them, for example, to generate the measured values $X_M$, in given cases, also in real time and/or in the form of fieldbus transferable digital values, namely, digital values in each case encapsulated in a corresponding fieldbus-telegram and representing the at least one measurement variable x. The measured values $X_M$ generated by means of the transmitter electronics 20 can, for example, be displayed on-site and/or be transmitted—per wire, e.g. DIN IEC 60381-1 conforming, via connected fieldbus and/or wirelessly per radio, e.g. IEEE 802.15.1 or IEEE 802.15.4 conforming—to an electronic data processing system, for instance, a programmable logic controller (PLC) and/or a process control station. For displaying measuring system internally produced measured values and/or, in given cases, measuring system internally generated system status messages, such as, for instance, a failure message or an alarm, on-site, the measuring system can have, for example, a display- and interaction element HMI, such as, for instance, an LCD-, OFED- or TFT display placed in the protective housing 200 behind a window pane correspondingly provided therein, together with a corresponding input keypad and/or a touch screen communicating with the transmitter electronics 20. In given cases, the display- and interaction element HMI can also be portable and even be embodied—such as shown in FIG. 3—as a component of the transmitter electronics 20. In advantageous manner, the, for example, also remotely parameterable, transmitter electronics 20 can, furthermore, be so designed that during operation of the measuring system it can exchange, via a data transmission system, for example, a fieldbus system and/or wirelessly per radio, measuring—and/or other operating data, such as, for instance, current parameter measured values of the flowing fluid, measuring system specific system diagnostic values and/or setting values serving for control of the measuring system, with a superordinated electronic data processing system, for example, a programmable logic controller (PLC), a personal computer and/or a work station. Furthermore, the transmitter electronics 20 can be so designed that it can be supplied from an external energy supply, for example, also via the aforementioned fieldbus system. Alternatively or supplementally, however, also a chemical energy storer can be used for energy supply of the measuring system, for instance, in the form of a single-use battery-, or a rechargeable battery-pack placed within the protective housing 200 or within a separate supply module appropriately docked on the protective housing 200. Particularly for the mentioned case, in which the measuring system is provided for coupling to a fieldbus- or other communication means, the, for example, also (re-)programmable on-site and/or via communication apparatus, transmitter electronics 20 can, furthermore, have a communication interface COM embodied for data communication according to one of the relevant industry standards. The communication interface COM can be adapted e.g. to transfer measuring- and/or operating data, consequently measured values representing the at least one measurement variable, to the above-mentioned programmable logic controller or to a superordinated process control system and/or to receive settings data for the measuring system. Moreover, the transmitter electronics 20 can, for example, have an internal power supply circuit PSC, which is fed during operation via the aforementioned fieldbus system from an external energy supply provided in the aforementioned data processing system. In such case, the transmitter electronics 20 can, furthermore, e.g. be so embodied that it is electrically connectable by means of a two-wire connection 2L, for example, configured as a 4-20 mA electrical current loop, with the external electronic data processing system and via that be supplied with electrical energy as well as being able to transmit measured values to the data processing system; the measuring system can, however, for example, also be embodied as a so-called four-conductor measuring device, in the case of which the internal power supply circuit PSC of the transmitter electronics 20 is connected by means of a first pair of lines with an external energy supply and the above-mentioned internal communication circuit COM of the transmitter electronics 20 is connected by means of a second pair of lines with an external data processing circuit or an external data sending system.

For processing the at least two sensors signals s1, s2, or for generating the measured values $X_M$ from the sensor signals s1, s2, the transmitter electronics 20 can, such as also shown schematically in FIG. 3, have, furthermore, a measuring- and evaluating-circuit μC—for example, one formed by means of one or more microprocessors and/or by means of one or more digital signal processors (DSP) and/or by means of one or more programmable logic chips (FPGA) and/or by means of one or more customer specific programmed logic chips (ASIC) and/or installed as a microcomputer. Each of the sensor signals s1, s2 can, accordingly, firstly be conditioned in the transmitter electronics 20 for further evaluation, for example, by means of a signal input stage A/D provided in the measuring- and evaluating circuit μC and equally as well forming, in each case, an interface to the sensor arrangement 210, and to the sensor arrangement 220, namely suitably preamplified and—not least of all for the purpose of a corresponding band limiting for ensuring the Nyquist sampling theorem—thereafter be filtered. The measuring- and evaluating circuit μC can, additionally, have, as well as also shown schematically in FIG. 3, at least one non-volatile memory EEPROM, for example, serving for storing of control- and operating programs, and/or setting values determining functions of the measuring- and evaluating circuit μC, and/or volatile memory RAM, for example, serving for the temporary storing of sampled values generated by means of the signal input stage A/D and/or integrated in the, in given cases, provided, at least one microprocessor. Additionally, for example, also program-code for evaluation programs for the measuring- and evaluating circuit μC serving for generating measured values can stored be persistently in the non-volatile data memory EEPROM and, upon the starting of the transmitter electronics 20, be loaded into the volatile data memory RAM. Equally, measured values generated during operation by means of the transmitter electronics 20, or its measuring- and evaluating circuit μC, can be loaded in one of the volatile memory RAM and/or the non-volatile-memory EEPROM and kept, at least temporarily, for later further processing.

As shown in FIGS. 3 and 4, the transmitter electronics 20 of the measuring system of the invention is, furthermore, also adapted to convert both the, in given cases, firstly, conditioned sensor signal s1 into a first sensor signal sampling sequence $s_{D1}$ approximating the sensor signal s1, namely a first sensor signal sampling sequence $s_{D1}$ in the form of a sequence of digital sampled values $S_{D1}[m]=S_{D1}[t_m \cdot f_{s1}]$ won with a sampling rate $f_{s1}=1/(t_{m+1}-t_m)=1/T_{s1}$ from the sensor signal s1 at different sampling points in time $t_m=m \cdot T_{s1}$, as well as also to convert the, in given cases, firstly, conditioned sensor signal s2 into a second sensor signal sampling sequence $s_{D2}$ approximating the sensor signal s2, namely a second sensor signal sampling sequence $s_{D2}$ in the form of a sequence of digital sampled values $S_{D2}[n]=S_{D2}[t_n \cdot f_{s2}]$ won with a sampling rate $f_{s2}=1/(t_{n+1}-t_n)=1/T_{s2}$ from the sensor signal s2 at different sampling points in time $t_n=n \cdot T_{s2}$; this, especially, in such a manner that the second sensor signal sampling sequence $s_{D2}$ approximates at least the above-mentioned at least one wanted component $s_W$, or that at least an instantaneous frequency and/or at least one instantaneous amplitude and/or at least one instantaneous phase angle of the wanted component $s_W$ can be ascertained based on the sensor signal sampling sequence $s_{D2}$. The above indicated sampling rates $f_{s1}$, $f_{s2}$ are kept constant for at least one given time interval, in such a manner that the sampling points in time $t_m$, $t_n$ are equidistantly spaced in time from one another, at least during the time interval. Each of the sampling rates $f_{s1}$, $f_{s2}$ is, furthermore, selected sufficiently high, that at least a frequency interval enclosing the possible signal frequencies of the variable wanted component $s_W$ during operation is contained re-constructably in each of the sensor signal sampling sequences $s_{D1}$, $s_{D2}$. The sampling rates $f_{s1}$, $f_{s2}$ can be selected, for example, sufficiently high that they amount to greater than twice a highest signal frequency of the wanted components $s_W$ of the sensor signal s2. Alternatively, or in supplementation, the sampling rate $f_{s1}$ can, furthermore, also be so set that it equals sampling rate $f_{s2}$. For forming the sampling sequences $s_{D1}$, $s_{D2}$, the required clock signals, i.e. clock signals defining the sampling rates $f_{s1}$, $f_{s2}$ can be provided, for example, by means of a clock signal generator and corresponding, in given cases, also adjustable, frequency dividers provided in the measuring- and evaluating circuit μC. The sensor signal sampling sequences $s_{D1}$, $s_{D2}$ are then further evaluated by means of the measuring- and evaluating circuit μC, in such a manner that, based on the sensor signal sampling sequences $s_{D1}$, $s_{D2}$, the at least one measured value is ascertained, or a corresponding measured values sequence $x_M$ is produced, namely a sequence of digital measured values $X_M$ following one after another in time, consequently digital measured values $X_M$ representing the at least one measurement variable and following one after the other in time; this, for example, in such a manner that, based on the frequency of the wanted component $s_W$, a flow velocity and/or a volume flow rate of the fluid FL flowing along the flow path is ascertained, for instance, for the above described case, in which by means of the flow obstruction 120 a Kármán vortex street is produced in the fluid FL flowing downstream thereof and that, correspondingly, the frequency of the wanted component $s_W$ corresponds to a shedding rate of vortices shed on the flow obstruction 120, and thus to pressure fluctuations associated therewith. Alternatively or supplementally, based on the sensor signal sampling sequences $s_{D1}$, $s_{D2}$, for example, also the above-mentioned pressure difference between the portion 100-1 and the portion 100-3 can be ascertained, and, based on that, the flow velocity and/or a volume flow rate of the fluid FL can be calculated.

As already mentioned, at times, even upstream of the portion 100-1, consequently even before reaching the sensor arrangement 210, e.g. outside of the measuring system, the flowing fluid FL can experience an external disturbance, which changes as a function of time, or is not directly predictable, in such a manner that the external disturbance influences both the sensor signal s1, e.g. its frequency spectrum, as well as also—together with the above described (internal) disturbance d—the sensor signal s2, e.g. its frequency spectrum. As a result, the sensor signal s2 can have besides the wanted component also numerous other signal components, which have, for example, only a small frequency distance from the wanted component and/or a significantly greater amplitude. Such disturbances can be caused e.g. by pump or valve induced pressure pulsations in the flowing fluid or, however, for example, also by vibrations of the pipeline.

In order nevertheless to be able to filter to collect the wanted component $s_W$ contained in the sensor signal $s_2$ as rapidly as possible, equally as well, as precisely as possible, from the sensor signal $s_2$, FIG. 4 shows implemented in the transmitter electronics 20, for example, in its measuring- and evaluating circuit μC, a digital adaptive filter LPE, namely a digital filter serving for the (digital) filtering of the sensor signal sampling sequence $s_{D1}$. A digital adaptive filter is, as is known, a special signal processing filter, which has the property of being able to change its z-transfer function automatically during operation, namely controlled by an internally executed control algorithm, in such a manner that a sampling sequence applied on the input is processed by means of a transversal filter adaptable as regards its pass-through region, or a center frequency characterizing it, for example, a filter having a finite impulse response (finite impulse response filter), and in the case of which the pass-through region, or the transfer function, of the transversal filter is changed by numerical recalculation of the filter coefficients until an output sequence generated by means of the transversal filter agrees at least approximately, or sufficiently exactly, with a desired target sequence.

Figure 9B:
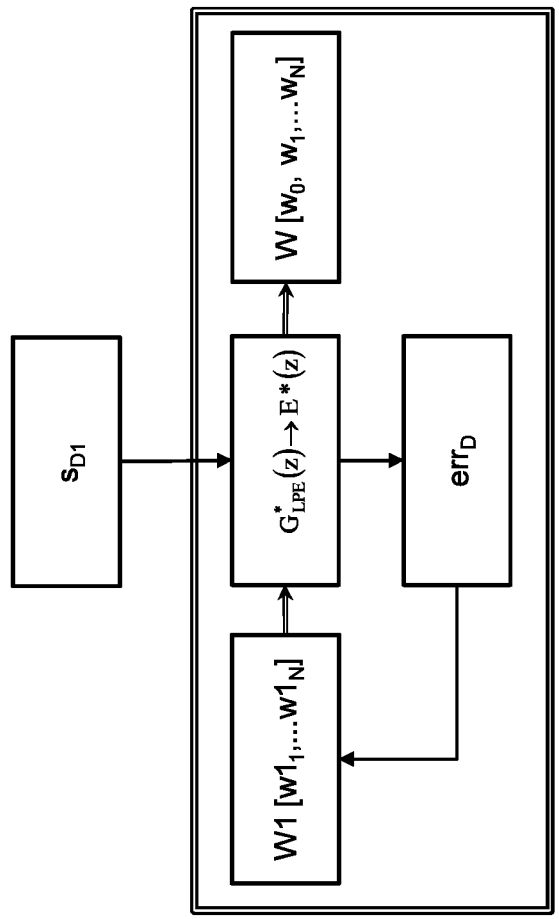
FIG. 9a and 9b show, schematically, a flow diagram of a method of the present disclosure, or an embodiment thereof.
Figure 9A:
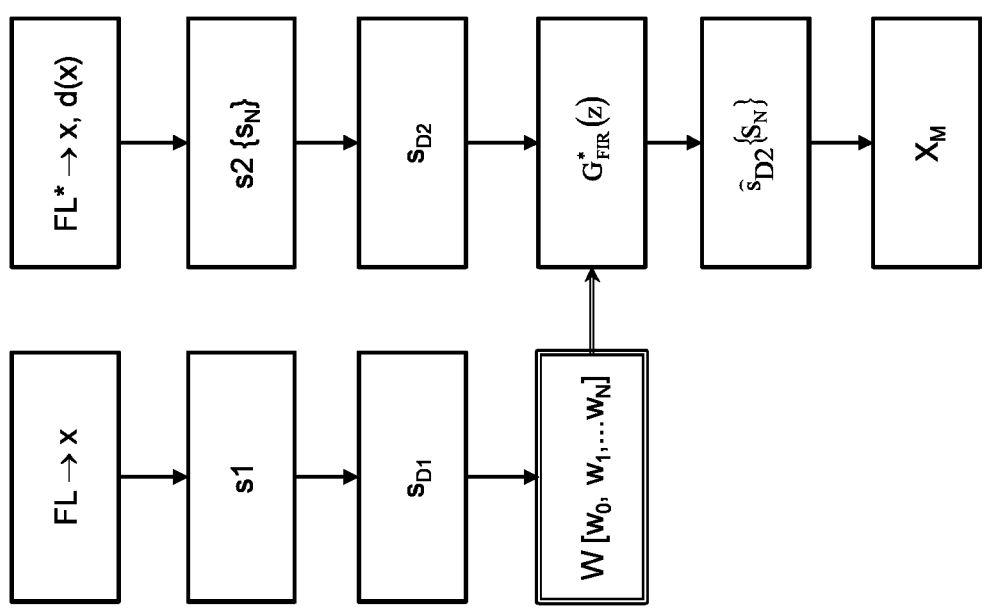

The transmitter electronics 20 of the measuring system is, accordingly, further adapted by means of of the above described digital adaptive filter LPE to ascertain from the sensor signal sampling sequence $s_{D1}$, firstly, a wanted signal filter coefficients set W, namely a set of N filter coefficients $w_k$ having, for example, a plurality N of not less than five (N≥5) filter coefficients $w_k$, and, such as shown schematically in FIGS. 4, and 9a, thereafter by means of the wanted signal filter coefficients set W to form a transfer function, e.g. a z-transfer function $G_{FIR}^*(z)$, of a wanted signal filter FIR-N, namely a digital filter serving for the (digital) filtering of the sensor signal sampling sequence $s_{D2}$, in such a manner that the above-mentioned z-transfer function $G_{FIR}^*(z)$ of the wanted signal filter FIR-N, thus a pass-through region, or a center frequency of the wanted signal filter FIR-N, is determined by the wanted signal filter coefficients set W. The filter coefficients $w_k$ of the wanted signal filter coefficients set W can, in such case, be so selected that at least two-, for example, a plurality or all—of the filter coefficients $w_k$ of the wanted signal filter coefficients set W differ from one another, for example, have different magnitudes and/or different sign. The wanted signal filter FIR-N can be, for example, a digital filter with finite impulse response.

Furthermore, the transmitter electronics 20 is, additionally, also adapted by means of the wanted signal filter FIR-N as well as by means of the sensor signal sampling sequence $s_{D2}$ to produce a wanted signal sequence $\hat{s}_{D2}$, namely a sequence of digital function values $$\hat{s}_{D2}[n] = \sum_{k=0}^{N-1} w_k \cdot s_{D2}[n-k]$$

calculated by means of the wanted signal filter FIR from the sensor signal sampling sequence $s_{D2}$; this according to an additional embodiment at least at times in such a manner that, as well as also indicated in FIG. 9a, the wanted signal sequence $\hat{s}_{D2}$ contains, or approximates, at least the wanted component ($\hat{s}_{D2} = \hat{s}_{D2} \{S_N\}$). Furthermore, the transmitter electronics 20 is, additionally, also adapted to produce from the above described, wanted signal sequence $\hat{s}_{D2}$ the sequence of digital measured values $X_M$ serving as measured values sequence $x_M$, for example, based on the wanted signal sequence $\hat{s}_{D2}$ recurringly to ascertain the above-mentioned frequency of the wanted component $s_W$, for instance, in order based on the so won frequency of the wanted component, such as already mentioned, to calculate current flow velocity and/or volume flow rate of the flowing fluid FL. Alternatively or supplementally, the transmitter electronics 20, or its measuring- and evaluating circuit μC can, furthermore, for example, also be adapted, based on a signal frequency recurringly ascertained from the wanted signal sequence $\hat{s}_{D2}$ for the wanted component $s_W$ recurringly to calculate a flow velocity and/or a volume flow rate of the flowing fluid FL or, for example, from the above described wanted signal sequence $\hat{s}_{D2}$ and the sensor signal sampling sequence $s_{D1}$ recurringly to calculate a pressure difference and/or a volume flow rate of the flowing fluid FL. Additionally, the measuring- and evaluating circuit μC, or the transmitter electronics 20 formed therewith, can also be adapted, for ascertaining the measured value $X_M$, or the production of the measured values sequence $x_M$, firstly, yet again to filter, or still further to smooth, the wanted signal sequence $\hat{s}_{D2}$, for example, by means of an additional digital signal filter FIR-N* following the wanted signal filter FIR-N, or integrated therein. The signal filter FIR-N* can, for example, be a FIR-filter configured as a low-, high- and/or bandpass filter, in given cases, also with a pass-through region adapted and/or updatable for the wanted component, or with a center frequency adapted and/or updatable for the wanted component.

The z-transfer function $G_{FIR}^*(z)$ formed by means of the wanted signal filter coefficients set W for the wanted signal filter FIR-N correspondingly to be applied to the sensor signal sampling sequence $s_{D2}$ generated with the sampling rate $T_{s2}$ can generally be formulated, for example, in the following way:

$$G_{FIR}^*(z) = Z(g[n]) = \sum_{k=0}^{N-1} w_k \cdot z^{-k} = \sum_{k=0}^{N-1} w_k \cdot e^{-j\omega T_{s2}}. \tag{1}$$

The wanted signal filter coefficients set W, or the wanted signal filter FIR-N formed therewith, can, such as already indicated, contain five or more (N≥5) for example, even greater than 10 (N>10), filter coefficients $w_k$. For the above described case, in which the transmitter electronics 20, or its measuring- and evaluating circuit μC, has an, especially non-volatile-, memory EEPROM, the filter coefficients $w_k$ of the wanted signal filter coefficients set W can additionally, for example, also be stored, for example, persistently, in the memory EEPROM. Moreover, the measuring- and evaluating circuit μC, or the transmitter electronics 20 formed therewith, can, for instance, for the purpose of increasing the computing speed, have a first signal-, or microprocessor serving for ascertaining the wanted signal filter coefficients set W, consequently serving for executing the adaptive filter LPE, as well as a second signal-, or microprocessor serving for processing the sensor signal sampling sequence $s_{D2}$ to form the wanted signal sequence $\hat{s}_{D2}$, consequently serving for executing the wanted signal filter FIR-N.

In an additional embodiment, it is, furthermore, provided, thus the transmitter electronics 20 is, furthermore, adapted, at times, for example, also recurringly and/or cyclically with a predeterminable, or predetermined exchange rate, to replace with the wanted signal filter coefficients set W the wanted signal filter coefficients set W*, firstly, determining the above-mentioned z-transfer function $G_{FIR}^*(z)$ of the wanted signal filter FIR-N, —and, for example, likewise earlier ascertained from the sensor signal sampling sequence $s_{D1}$ and/or differing from the wanted signal filter coefficients set W; this, for example, also in such a manner that the transmitter electronics 20 regularly completely recalculates the wanted signal filter coefficients set W and thereafter automatically replaces the current, equally as well, to be replaced, wanted signal filter coefficients set W*with the new wanted signal filter coefficients set W, regularly according to the above mentioned exchange rate, or, for example, only when required, for instance, because the current wanted signal filter coefficients W* and the new wanted signal filter coefficients set W differ from one another by more than a predetermined measure of tolerance. The replacing of the wanted signal filter coefficients set W* firstly determining the z-transfer function $G_{FIR}^*(z)$ of the wanted signal filter FIR-N by the wanted signal filter coefficients set W with the exchange rate can be cyclically repeated, for example, in such a manner that the exchange rate is lower than the sampling rate $f_{s1}$ of the sensor signal sampling sequence $s_{D1}$ and/or is lower than the sampling rate $f_{s2}$ of the sensor signal sampling sequence $s_{D2}$.

In an additional embodiment of the invention, the digital adaptive filter LPE is ready-made, or the transmitter electronics is 20 adapted, to generate from the sensor signal sampling sequence $s_{D1}$, firstly, an estimated signal sequence $\hat{s}_{D1}$, namely a sequence of digital function values $\hat{S}_{D1}[m]$ calculated from the sensor signal sampling sequence $s_{D1}$ by means of the adaptive filter LPE; this especially with the goal, or in such a manner, that the estimated signal sequence $\hat{s}_{D1}$, at least at times, equals or at least approximately equals the sensor signal sampling sequence $s_{D1}$, or has a minimum of least squares residuals (BLUP—Best Linear Unbiased Prediction) from the sensor signal sampling sequence $s_{D1}$. For such purpose, the transmitter electronics 20 can, furthermore, also be adapted to ascertain the filter coefficients $w_k$ of the wanted signal filter coefficients set W by means of an LMS algorithm (Least Mean Squares algorithm) and/or by means of an RMS algorithm (recursive least squares algorithm).

In an additional embodiment, it is, accordingly, furthermore, provided that the above-mentioned digital adaptive filter LPE, as well as also indicated in FIG. 9b, comprises a transversal filter FIR-A—here to be applied correspondingly to the sensor signal sampling sequence $s_{D1}$—namely a transversal filter FIR-A in the form of a digital filter having a z-transfer function $G_{LPE}^*(z)$ determined by a transversal filter coefficients set W1, namely a set of M filter coefficients $w1_k[n]$. The transversal filter FIR-A can be, for example, a digital filter with finite impulse response (FIR filter). Accordingly, the z-transfer function $G_{FIR}^*(z)$ of the transversal filter FIR-A formed by means of the transversal filter coefficients set W1 can generally, i.e. applied to the sensor signal sampling sequence $s_{D1}$ generated with the sampling rate $T_{s1}$, be formulated, for example, in the following way:

$$G_{LPE}^*(z) = Z(g[m]) = \sum_{k=1}^{M} w1_k \cdot z^{-k} = \sum_{k=1}^{M} w1_k \cdot e^{-j\omega T_{s1}}. \quad (2)$$

For the above described case, in which the transmitter electronics 20, or its measuring- and evaluating circuit µC, has an, especially non-volatile-, memory EEPROM, the filter coefficients $w1_k$ of the transversal filter coefficients set W1 can, additionally, for example, also be stored, for example, persistently, in the memory EEPROM, in given cases, also together with the filter coefficients $w_k$ of the wanted signal filter coefficients set W. The transmitter electronics 20, or its measuring- and evaluating circuit µC, can, additionally, furthermore, be provided, or adapted, recurringly to change the transfer function, e.g. the z-transfer function of transversal filter FIR-A, consequently a pass-through region, or a center frequency of the transversal filter FIR-A characterizing it, by numerical recalculation the M filter coefficients $w1_k[n]$, in such a manner that the above-mentioned estimated signal sequence $\hat{s}_{D1}$ is provided on the output of the transversal filter and that the estimated signal sequence $\hat{s}_{D1}$, as a result, at least approximately, or sufficiently exactly agrees with the sensor signal sampling sequence $s_{D1}$—here serving as target sequence to be achieved. Accordingly, in an additional embodiment of the invention, it is provided, e.g. the transmitter electronics is 20 adapted, by means of the transversal filter FIR-A as well as the sensor signal sampling sequence $s_{D1}$ to produce the estimated signal sequence $\hat{s}_{D1}$ as a sequence of digital function values $\hat{s}_{D1}[m]$ calculated by means of the digital transversal filter FIR-A from the sensor signal sampling sequence $s_{D1}$; this in agreement with the above described z-transfer function $G_{LPE}^*(z)$ of the transversal filter FIR-A (Eq. 2), for example, according to the formula:

$$\hat{S}_{D1}[m] = \sum_{k=1}^{M} w1_k \cdot S_{D1}[m-k]. \quad (3)$$

The ascertaining of the filter coefficients $w1_k$ of the transversal filter coefficients set W1 can, such as already indicated, occur, for example, in such a manner, e.g. with the goal, that the estimated signal sequence $\hat{s}_{D1}$ approximates or predicts the sensor signal sampling sequence $s_{D1}$ as well as possible, or, especially, as a result, equals or at least approximately equals the sensor signal sampling sequence $s_{D1}$, or has a minimum of least squares residuals (BLUP—Best Linear Unbiased Prediction) from the sensor signal sampling sequence $s_{D1}$. For such purpose, according to an additional embodiment of the invention, by means of the transmitter electronics 20, or the therein implemented digital adaptive filter LPE, as well as also schematically shown in FIG. 9b, an estimate error sequence $err_D$, namely a sequence of digital function values $Err_D[m]=f(S_{D1}[m], \hat{S}_{D1}[m])$, is ascertained, of which each shows—at the respective sampling point in time $t_m$, or instantaneously—a deviation between a particular sampling value $S_{D1}[m]$ of the sensor signal sampling sequence $s_{D1}$ and a function value $\hat{S}_{D1}[m]$ of the estimated signal sequence $\hat{s}_{D1}$ approximating the sampling value $S_{D1}[m]$; this, for example, in such a manner that, recurringly, in each case, a digital function value $Err_D[m]=S_{D1}[m]-\hat{S}_{D1}[m]$ is formed, which shows a corresponding difference between the sampling value $S_{D1}[m]$ of the sensor signal sampling sequence $s_{D1}$ and the, in each case, associated function value $\hat{S}_{D1}[m]$ of the estimated signal sequence $\hat{s}_{D1}$. Based on the above described z-transfer function $G_{PE}^*(z)$ of the digital transversal filter FIR-A, an estimate error function $E*(z)$ correspondingly serving for production of the estimate error sequence $err_D$ from the sensor signal sampling sequence $s_{D1}$ can be formed, for example, according to the following formula:

$$E*(z) = 1 - G_{LPE}^*(z) = 1 - \sum_{k=1}^{M} w1_k \cdot z^{-k} \quad (4)$$

and the digital function values $Err_D[m]$ of the estimate error sequence $err_D$ calculated from the sensor signal sampling sequence $s_{D1}$ can correspond to the function:

$$Err_D[m] = S_{D1}[m] - \sum_{k=1}^{M} w1_k \cdot S_{D1}[m-k] \quad (5)$$

As already mentioned, the filter coefficients $w1_k$ of the transversal filter coefficients set W1, or of the estimate error function E * (z) formed therewith, can be ascertained, furthermore, for example, in each case, by means of an LMS- and/or RMS algorithm executed in the transmitter electronics 20, or its measuring- and evaluating circuit μC, for example, in such a manner that the function values $Err_D$ [m] are at least approximately zero. The wanted signal filter coefficients set W for the wanted signal filter FIR-N can, such as already indicated, and shown in FIGS. 9a and 9b, thereafter be ascertained from the transversal filter coefficients set W1 of the transversal filter FIR-A, for example, by just using them directly, in case the estimated signal sequence $\hat{s}_{D1}$ at least for a predetermined sample-, or time, interval -, for example, of greater than M, or $M \cdot T_{s1}$—equals or at least approximately equals the sensor signal sampling sequence $s_{D1}$, or has a minimum of least squares residuals (BLUP—Best Linear Unbiased Prediction) from the sensor signal sampling sequence $s_{D1}$, or in case the estimate error function E * (z) is approximately zero for a correspondingly long time. In an additional embodiment of the invention, it is accordingly provided that the wanted signal filter coefficients set W contains all M filter coefficients $w1_k$ of the transversal filter coefficients set W1; this, especially, also in such a manner that each filter coefficient $w_{1k}$ of the transversal filter coefficients set W1 is incorporated as filter coefficient $w_k$ of the wanted signal filter coefficients set W ($w_{1k} \rightarrow w_k$), or that, for each filter coefficient $w_{1k}$ of the transversal filter coefficients set W1, $w_{1k}=w_k$. Accordingly, the transversal filter coefficients set W1 equally as the wanted signal filter coefficients set W, and the transversal filter FIR-A equally as the wanted signal filter FIR-N, can contain five or more, for example, also greater than 10 (M>10), filter coefficients $w1_k$. Particularly for the above-described case, in which based on the wanted signal sequence $\hat{s}_{D2}$ the above-mentioned frequency of the wanted component $s_W$ is recurringly ascertained, according to an additional embodiment of the invention, it is, additionally, provided that the wanted signal filter coefficients set W, or the wanted signal filter FIR-N formed therewith, contains, at least at times, at least one filter coefficient $w1_0$ different from zero, for example, a negative and/or predetermined filter coefficient $w1_0$, which the transversal filter coefficients set W1, and the transversal filter FIR-A formed therewith, do not contain. The filter coefficient $w1_0$ can, for example, amount to −1 ($w1_0=-1$), so that, thus, as a result, the wanted signal sequence $\hat{s}_{D2}$ is formed for practical purposes by subtracting a sensor signal estimated sequence (or a corresponding synthesized sensor signal sampling sequence) for the sensor signal s1 suitably synchronized with the sampling point in time $t_n$ from the sensor signal sampling sequence $s_{D2}$. Alternatively or supplementally, wanted signal filter coefficients set W and transversal filter coefficients set W1, or the signal filters (FIR-N, FIR-A) formed therewith can, at least at times, be equal, for example, in order based on both the wanted signal sequence $\hat{s}_{D2}$ as well as also the sensor signal sampling sequence $s_{D1}$ and/or the estimated signal sequence $\hat{s}_{D1}$, to ascertain the above-mentioned, volume flow dependent, pressure difference between the fluid flowing in the portion 100-1 and the fluid flowing in the portion 100-3.

The invention claimed is:

1. A measuring system for measuring at least one measurement variable, changeable as a function of time, of a fluid flowing along a flow path with a predetermined flow direction, the measuring system comprising:
   a tube arrangement comprising a lumen defining a first portion of the flow path, a second portion of the flow path disposed in a flow direction downstream of the first portion, and a third portion of the flow path disposed in the flow direction downstream of the second portion and a tube wall surrounding the lumen;
   a flow obstruction arranged within the tube arrangement in the second portion of the flow path, the flow obstruction configured to effect a disturbance in the flowing fluid, the disturbance dependent on the at least one measurement variable and/or serving as a measurable effect dependent on the at least one measurement variable;
   a first sensor arrangement configured to generate a first sensor signal having a first frequency spectrum influenced by the fluid flowing within the first portion;
   a second sensor arrangement configured to generate a second sensor signal having a second frequency spectrum influenced by the fluid flowing within the third portion, the second frequency spectrum deviating from the first frequency spectrum and/or including at least one wanted component, the at least one wanted component including a spectral signal component influenced by the at least one measurement variable as regards at least one signal parameter; and
   a transmitter electronics including a microprocessor and configured to:
      receive the first sensor signal and convert such into a first sensor signal sampling sequence approximating the first sensor signal, the first sensor signal sampling sequence including a first sequence of digital sampled values, defined by $S_{D1}[m]=S_{D1}[t_m \cdot f_{s1}]$, using a first sampling rate, defined by $f_{s1}=1/(t_{m+1}-t_m)=1/T_{s1}$, from the first sensor signal at different sampling points in time, given by $t_n=n \cdot T_{s1}$;
      receive the second sensor signal and convert such into a second sensor signal sampling sequence approximating the second sensor signal, the second sensor signal sampling sequence including a second sequence of digital sampled values, defined by $S_{D2}[n]=S_{D2}[t_n \cdot f_{s2}]$ using a second sampling rate, defined by $f_{s2}=1/(t_{n+1}-t_n)=1/T_{s2}$, from the second sensor signal at different sampling points in time, given by $t_n=n \cdot T_{s2}$, such that the second sensor signal sampling sequence approximates at least one wanted spectral signal component of the second sensor signal influenced by the at least one measurement variable;
      using a digital adaptive filter, ascertain from the first sensor signal sampling sequence a wanted signal filter coefficients set including a set of N filter coefficients;
      using the wanted signal filter coefficients set, generate a first z-transfer function of a wanted signal filter, defined as:

$$G_{FIR}^*(z) = Z(g[n]) = \sum_{k=0}^{N-1} w_k \cdot z^{-k} = \sum_{k=0}^{N-1} w_k \cdot e^{-j\omega T_{s2}}.$$

wherein $w_k$ are the filter coefficients, the wanted signal filter being a digital filter adapted to filter the second sensor signal sampling sequence such that the first z-transfer function of the wanted signal filter is determined by the wanted signal filter coefficients set;

generate a wanted signal sequence, using the wanted signal filter and the second sensor signal sampling sequence, the wanted signal sequence being a sequence of digital function values defined by:

$$\hat{S}_{D2}[n] = \sum_{k=0}^{N-1} w_k \cdot S_{D2}[n-k],$$

to generate from the wanted signal sequence a measured values sequence, being a sequence of digital measured values representing the at least one measurement variable and following one after the other in time.

2. The measuring system of claim 1, wherein the transmitter electronics is configured to determine the filter coefficients of the wanted signal filter coefficients set using a least mean squares algorithm and/or a recursive least squares algorithm.

3. The measuring system of claim 1, wherein the transmitter electronics includes a memory configured to store at least the filter coefficients of the wanted signal filter coefficients set.

4. The measuring system of claim 1, wherein the transmitter electronics is configured to repeatedly calculate a transversal filter coefficients set of M filter coefficients determining a second z-transfer function, defined by:

$$G^*_{LPE}(z) = Z(g[m]) = \sum_{k=1}^{M} w1_k \cdot z^{-k} \text{ or}$$

$$G^*_{LPE}(z) = Z(g[m]) = \sum_{k=1}^{M} w1_k \cdot z^{-k} = \sum_{k=1}^{M} w1_k \cdot e^{-j\omega T_{s1}},$$

of a transversal filter of the digital adaptive filter.

5. The measuring system of claim 4, wherein the transmitter electronics is configured to ascertain the wanted signal filter coefficients set for the wanted signal filter from the transversal filter coefficients set of the transversal filter.

6. The measuring system of claim 1, wherein the digital adaptive filter is configured to generate from the first sensor signal sampling sequence an estimated signal sequence, being a sequence of digital function values, defined by:

$$\hat{S}_{D1}[m] = \sum_{k=1}^{M} w1_k \cdot S_{D1}[m-k],$$

calculated from the first sensor signal sampling sequence using a digital transversal filter such that the estimated signal sequence is at least at times equal to or at least approximately equal to the sensor signal sampling sequence or has a minimum of least squares residuals from the sensor signal sampling sequence under a best linear unbiased prediction.

7. The measuring system of claim 1, wherein the transmitter electronics is configured to ascertain a frequency of the wanted component based on the wanted signal sequence.

8. The measuring system of claim 1, wherein the at least one measurement variable includes a flow velocity and/or a volume flow rate of the fluid, and wherein the transmitter electronics is configured to determine the flow velocity and/or the volume flow rate of the fluid based on a frequency of the wanted component obtained from the wanted signal sequence.

9. The measuring system of claim 1, wherein the second portion, or the flow obstruction formed therewith, is adapted to increase a flow velocity of the fluid flowing passed and/or through and/or to lessen a static pressure prevailing in the fluid flowing passed and/or through and/or to effect a pressure difference dependent on a volume flow rate along a measuring path formed by the first, second and third portions.

10. The measuring system of claim 1, wherein the second portion, or the flow obstruction formed therewith, is adapted to induce vortices in the fluid such that a Kármán vortex street is formed in the fluid flowing downstream of the flow obstruction.

11. The measuring system of claim 1, wherein the flow obstruction is formed by a diaphragm.

12. The measuring system of claim 1, wherein the flow obstruction is formed by a prismatic bluff body.

13. The measuring system of claim 1, wherein the flow obstruction is formed by a nozzle.

14. The measuring system of claim 1, wherein:
the first sensor arrangement includes a pressure sensor disposed at the first portion; and/or
the second sensor arrangement includes a pressure sensor disposed at least partially at the third portion; and/or
the first sensor arrangement includes a microphone disposed at the first portion; and/or
the second sensor arrangement includes a microphone disposed at least partially at the third portion; and/or
the second sensor arrangement includes a sensor paddle protruding into the third portion; and/or
the first sensor arrangement includes two ultrasonic transducers, both disposed at the first portion; and/or
the second sensor arrangement includes two ultrasonic transducers, both disposed at least partially at the third portion; and/or
the transmitter electronics is electrically connected both with the first sensor arrangement and the second sensor arrangement; and/or
the second portion includes a prismatic bluff body; and/or
the second portion includes a diaphragm; and/or
at least the second portion includes a vibronic measuring transducer; and/or
a smallest distance between the first and third portions amounts to greater than three times a smallest caliber of the tube arrangement; and/or
a smallest distance between the first and third portions amounts to less than ten times a greatest caliber of the tube arrangement.

15. A method for measuring at least one measurement variable, changeable as a function of time, of a fluid flowing along a flow path with a predetermined flow direction, the method comprising:
providing the flow path, which includes a first portion, a second portion disposed in the flow direction downstream of the first portion, and a third portion disposed in the flow direction downstream of the second portion, wherein within the second portion a flow obstruction is configured to effect a disturbance in the flowing fluid dependent on the at least one measurement variable and/or a measurable effect dependent on the at least one measurement variable;

enabling the fluid to flow along the flow path such that volume portions of the fluid flow from the first portion to the second portion and then to the third portion, wherein the flow obstruction of the second portion effects the disturbance;

generating a first sensor signal having a first frequency spectrum influenced by the fluid flowing within the first portion;

converting the first sensor signal into a first sensor signal sampling sequence of digital sampled values approximating the first sensor signal obtained from the first sensor signal at different, time-equidistant sampling points in time at a constant sampling rate;

generating a second sensor signal having a second frequency spectrum influenced by the fluid flowing within the second portion and/or within the third portion, wherein the second frequency spectrum deviating from the first frequency spectrum and/or includes at least one wanted spectral signal component influenced by the at least one measurement variable or the disturbance with respect to at least one signal parameter;

converting the second sensor signal into a second sensor signal sampling sequence of digital sampled values approximating the second sensor signal obtained from the second sensor signal at different, time-equidistant sampling points in time at a constant sampling rate, wherein the second sensor signal sampling sequence approximates at least one wanted spectral signal component of the second sensor signal influenced by the at least one measurement variable;

using the first sensor signal sampling sequence and a digital adaptive filter to determine from the first sensor signal sampling sequence at least one wanted signal filter coefficients set, including at least five filter coefficients and/or filter coefficients at least partially differing from one another;

using the wanted signal filter coefficients set to define a first z-transfer function of a wanted signal filter, the first z-transfer function defined as:

$$G_{FIR}^*(z) = Z(g[n]) = \sum_{k=0}^{N-1} w_k \cdot z^{-k} = \sum_{k=0}^{N-1} w_k \cdot e^{-j\omega T_{s2}},$$

wherein the wanted signal filter is a digital filter configured to filter the second sensor signal sampling sequence such that the first z-transfer function of the wanted signal filter is determined by the wanted signal filter coefficients set, wherein N is the number of filter coefficients, $w_k$, and $T_{s2}$ is the sampling period of the second sensor signal;

using the second sensor signal sampling sequence and the wanted signal filter to generate a wanted signal sequence, wherein the wanted signal sequence is a sequence of digital function values calculated from the second sensor signal sampling sequence using the wanted signal filter, the wanted signal sequence; and generating a measured values sequence from the wanted signal sequence, wherein the measured values sequence is a sequence of digital measured values representing the at least one measurement variable and following one after the other in time.

16. The method of claim 15, wherein:
the filter coefficients of the wanted signal filter coefficients set are determined using an least mean squares algorithm and/or a recursive least squares algorithm; and/or
at least two of the filter coefficients of the wanted signal filter coefficients set differ from one another; and/or
the wanted signal filter coefficients set, or the wanted signal filter defined therewith, includes five or more filter coefficients; and/or
the sampling rate of the first sensor signal sampling sequence and the sampling rate of the second sensor signal sampling sequence are the same.

17. The method of claim 15, further comprising recurringly and/or cyclically replacing a wanted signal filter coefficients set previously determined from the first sensor signal sampling sequence and used to determine the first z-transfer function of the wanted signal filter with a subsequent wanted signal filter coefficients set.

18. The method of claim 17, wherein the replacing of the wanted signal filter coefficients set previously determined with the subsequent wanted signal filter coefficients set is repeated cyclically at an exchange rate such that the exchange rate is lower than the sampling rate of the first sensor signal sampling sequence and/or is lower than the sampling rate of the second sensor signal sampling sequence.

19. The method of claim 15, wherein the digital adaptive filter comprises a digital transversal filter having a second z-transfer function defined as:

$$G_{LPE}^*(z) = Z(g[m]) = \sum_{k=1}^{M} w1_k \cdot z^{-k} \text{ or}$$

$$G_{LPE}^*(z) = Z(g[m]) = \sum_{k=1}^{M} w1_k \cdot z^{-k} = \sum_{k=1}^{M} w1_k \cdot e^{-j\omega T_{s1}},$$

wherein M is the number of transversal filter coefficients, $w1_k$.

20. The method of claim 19, further comprising determining the wanted signal filter coefficients set for the wanted signal filter from the transversal filter coefficients set of the transversal filter such that the wanted signal filter coefficients set includes the filter coefficients of the transversal filter coefficients set.

21. The method of claim 19, further comprising generating an estimated signal sequence using the transversal filter and the first sensor signal sampling sequence, wherein the estimated signal sequence is a sequence of calculated digital function values from the first sensor signal sampling sequence using the digital transversal filter.

22. The method of claim 21, further comprising:
determining the transversal filter coefficients set from filter coefficients defining the second z-transfer function of the digital transversal filter such that the estimated signal sequence of the first sensor signal sampling sequence approximates or predicts the first sensor signal sampling sequence such that the estimated signal sequence has a minimum of least squares residuals from the first sensor signal sampling sequence; and/or
determining the wanted signal filter coefficients set for the wanted signal filter from the transversal filter coefficients set of the transversal filter when the estimated signal sequence for a predetermined sample, or time, interval equals or at least approximately equals the first sensor signal sampling sequence such that the estimated signal sequence has a minimum of least squares residuals from the first sensor signal sampling sequence.

23. The method of claim 21, further comprising generating an estimate error sequence in which a deviation between a sampling value of the first sensor signal sampling sequence and a function value of digital function values representing the estimated signal sequence.

24. The method of claim 23, further comprising generating the estimate error sequence from the first sensor signal sampling sequence such that the digital function values calculated from the first sensor signal sampling sequence correspond to the estimate error sequence using an estimate error function determined by the second z-transfer function of the digital transversal filter using the transversal filter coefficients set.

25. The method of claim 19, wherein:
the wanted signal filter coefficients set includes all M filter coefficients of the transversal filter coefficients set such that each filter coefficient of the transversal filter coefficients set is adopted as a filter coefficient of the wanted signal filter coefficients set and/or that; and/or
the wanted signal filter coefficients set, or the wanted signal filter defined therewith, includes a non-zero filter coefficient and/or a predetermined filter coefficient which the transversal filter coefficients set, or the transversal filter defined therewith, does not include, and/or
wherein the transversal filter coefficients set, or the transversal filter defined therewith, includes five or more filter coefficients; and/or
wherein the filter coefficients of the transversal filter coefficients set are determined using a least mean squares algorithm and/or using a recursive least squares algorithm.

26. The method of claim 15, wherein the second sensor signal includes at least one wanted spectral signal component influenced by the at least one measurement variable as regards at least one signal parameter, including one of an amplitude, a frequency and a phase angle.

27. The method of claim 26, wherein the second sensor signal sampling sequence includes, or approximates, the at least one wanted component.

28. The method of claim 27, wherein the wanted signal sequence includes, or approximates, at least the wanted component.

29. The method of claim 15, further comprising:
generating the first sensor signal using a first sensor arrangement disposed at least partially at the first portion and/or at least partially within the first portion; and
generating the second sensor signal using a second sensor arrangement disposed at least partially at the third portion and/or at least partially within the third portion.

30. The method of claim 15, wherein effecting the disturbance in the fluid flowing through the second portion comprises:
increasing a flow velocity of the fluid flowing within the second portion; and/or
lessening a static pressure prevailing in the fluid flowing within the second portion; and/or
providing a pressure gradient dependent on a volume flow within the fluid flowing along the flow path; and/or
inducing vortices in the fluid flowing within the second portion as to form a Kámán vortex street in the fluid flowing downstream of the flow obstruction.

31. The method of claim 15, wherein:
the first sensor arrangement includes a pressure sensor positioned at the first portion; and/or
the second sensor arrangement includes a pressure sensor positioned at the second and/or third portion; and/or
the second sensor arrangement includes a sensor paddle protruding into the third portion; and/or
the first sensor arrangement includes at least one ultrasonic transducer disposed at the first portion; and/or
the second sensor arrangement includes at least one ultrasonic transducer disposed at the second and/or third portion; and/or
the second portion includes a bluff body; and/or
the second portion includes a diaphragm; and/or
the second portion includes a tube arrangement of a vibronic measuring transducer, comprising two or more tubes and/or a line branching and/or a line junction.

32. The method of claim 15, wherein the method is performed using a measuring system adapted to perform the method, the measuring system comprising:
a tube arrangement comprising a lumen defining the first portion of the flow path, the second portion of the flow path disposed in a flow direction downstream of the first portion, and the third portion of the flow path disposed in the flow direction downstream of the second portion and a tube wall surrounding the lumen;
the flow obstruction arranged within the tube arrangement in the second portion of the flow path, the flow obstruction configured to effect a disturbance in the flowing fluid, the disturbance dependent on the at least one measurement variable and/or serving as a measurable effect dependent on the at least one measurement variable;
a first sensor arrangement configured to generate a first sensor signal having a first frequency spectrum influenced by the fluid flowing within the first portion;
a second sensor arrangement configured to generate a second sensor signal having a second frequency spectrum influenced by the fluid flowing within the third portion, the second frequency spectrum deviating from the first frequency spectrum and/or including at least one wanted component, the at least one wanted component including a spectral signal component influenced by the at least one measurement variable as regards at least one signal parameter; and
a transmitter electronics including a microprocessor and configured to:
receive the first sensor signal and convert such into a first sensor signal sampling sequence approximating the first sensor signal, the first sensor signal sampling sequence including a first sequence of digital sampled values, defined by $S_{D1}[m]=S_{D1}[t_m \cdot f_{s1}]$, using a first sampling rate, defined by $f_{s1}=1/(t_{m+1}-t_m)=1/T_{s1}$, from the first sensor signal at different sampling points in time, given by $t_n=n \cdot T_{s1}$;
receive the second sensor signal and convert such into a second sensor signal sampling sequence approximating the second sensor signal, the second sensor signal sampling sequence including a second sequence of digital sampled values, defined by $S_{D2}[n]=S_{D2}[t_n \cdot f_{s2}]$ using a second sampling rate, defined by $f_{s2}=1/(t_{n+1}-t_n)=1/T_{s2}$, from the second sensor signal at different sampling points in time, given by $t_n=n \cdot T_{s2}$, such that the second sensor signal sampling sequence approximates at least one wanted spectral signal component of the second sensor signal influenced by the at least one measurement variable;

using a digital adaptive filter, ascertain from the first sensor signal sampling sequence a wanted signal filter coefficients set including a set of N filter coefficients;

using the wanted signal filter coefficients set, generate a first z-transfer function of a wanted signal filter, defined as:

$$G^*_{FIR}(z) = Z(g[n]) = \sum_{k=0}^{N-1} w_k \cdot z^{-k} = \sum_{k=0}^{N-1} w_k \cdot e^{-j\omega T_{s2}},$$

wherein $w_k$ are the filter coefficients, the wanted signal filter being a digital filter adapted to filter the second sensor signal sampling sequence such that the first z-transfer function of the wanted signal filter is determined by the wanted signal filter coefficients set;

generate a wanted signal sequence, using the wanted signal filter and the second sensor signal sampling sequence, the wanted signal sequence being a sequence of digital function values defined by:

$$\hat{S}_{D2}[n] = \sum_{k=0}^{N-1} w_k \cdot S_{D2}[n-k],$$

to generate from the wanted signal sequence a measured values sequence, being a sequence of digital measured values representing the at least one measurement variable and following one after the other in time.

33. The method of claim 32, wherein the method is performed for setup and/or commissioning of the measuring system.

* * * * *